US012648619B2

(12) United States Patent　　　(10) Patent No.:　US 12,648,619 B2
Eisenmenger et al.　　　　　　　　(45) Date of Patent:　　　Jun. 9, 2026

(54) SYSTEMS AND METHODS FOR MANUFACTURING ARTICLES OF FOOTWEAR INCLUDING A SOLE STRUCTURE

(71) Applicant: Nike, Inc., Beaverton, OR (US)

(72) Inventors: Nancy D. Eisenmenger, Portland, OR (US); Travis K. Ernst, Portland, OR (US); Ken Fricke, Beaverton, OR (US); Javier Garcia, Beaverton, OR (US); Matthew McClellan, Beaverton, OR (US); Armando Petitjean, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 116 days.

(21) Appl. No.: 18/490,395

(22) Filed: Oct. 19, 2023

(65) Prior Publication Data

US 2024/0130478 A1　　Apr. 25, 2024
US 2024/0225187 A9　　Jul. 11, 2024

Related U.S. Application Data

(60) Provisional application No. 63/506,508, filed on Jun. 6, 2023, provisional application No. 63/506,515, filed (Continued)

(51) Int. Cl.
*A43B 13/20*　　　(2006.01)
*A43B 7/144*　　　(2022.01)
(Continued)

(52) U.S. Cl.
CPC ............ *A43B 13/206* (2013.01); *A43B 7/144* (2013.01); *A43B 13/186* (2013.01);
(Continued)

(58) Field of Classification Search
CPC . B29C 51/105; B29C 2791/006; B29C 51/10; B29C 10/105; B29C 51/085; B32B 37/1009; A43B 13/20
(Continued)

(56) References Cited

U.S. PATENT DOCUMENTS 1,400,146 A * 12/1921 Eggers ................ B29C 66/8322
　　　　　　　　　　　　　　　　　　　156/196
1,610,319 A 　 12/1926 Ray
(Continued)

FOREIGN PATENT DOCUMENTS

CN 　　 1981662 A 　 6/2007
CN 　 108606407 A 　 10/2018
(Continued)

OTHER PUBLICATIONS

International Search Report and Written Opinion, PCT/US2023/077321, mailed Feb. 15, 2024. (12 pages).
(Continued)

*Primary Examiner* — Scott W Dodds
(74) *Attorney, Agent, or Firm* — Bookoff McAndrews PLLC

(57) ABSTRACT

A method of forming a cushioning element. The method including placing a first sheet adjacent to an outer surface of a first mold portion, the first mold portion including a first mold cavity. The method including pressing a portion of the first sheet into the first mold portion and into the first mold cavity with a forming tool, wherein at least a portion of the forming tool is extended into the first mold cavity. The method including applying negative pressure to the first mold cavity to draw the portion of the first sheet into the first mold cavity, and joining a second sheet to the first sheet to form the cushioning element.

15 Claims, 29 Drawing Sheets

Related U.S. Application Data on Jun. 6, 2023, provisional application No. 63/380,177, filed on Oct. 19, 2022, provisional application No. 63/380,172, filed on Oct. 19, 2022, provisional application No. 63/380,202, filed on Oct. 19, 2022.

(51) Int. Cl.

| | |
|---|---|
| *A43B 13/18* | (2006.01) |
| *B29C 51/08* | (2006.01) |
| *B29C 51/10* | (2006.01) |
| *B29C 51/20* | (2006.01) |
| *B32B 37/10* | (2006.01) |

(52) U.S. Cl.
CPC ............ *A43B 13/187* (2013.01); *A43B 13/20* (2013.01); *B29C 51/08* (2013.01); *B29C 51/10* (2013.01); *B29C 51/105* (2013.01); *B29C 51/20* (2013.01); *B32B 37/1009* (2013.01); *B29C 2791/006* (2013.01)

(58) Field of Classification Search
USPC ................................................. 156/145–147
See application file for complete search history.

(56) References Cited

U.S. PATENT DOCUMENTS

| | | | |
|---|---|---|---|
| 2,100,492 A | | 11/1937 | Sindler |
| 2,627,676 A | | 2/1953 | Hack |
| 4,183,156 A | | 1/1980 | Rudy |
| 4,217,705 A | | 8/1980 | Donzis |
| 4,593,482 A | | 6/1986 | Mayer |
| 4,782,603 A | | 11/1988 | Brown |
| 4,852,274 A | | 8/1989 | Wilson |
| 4,864,738 A | | 9/1989 | Horovitz |
| 5,005,300 A | | 4/1991 | Diaz et al. |
| 5,042,176 A | | 8/1991 | Rudy |
| 5,112,560 A | * | 5/1992 | Moumdjian ......... A43B 13/203 264/516 |
| 5,117,566 A | | 6/1992 | Lloyd et al. |
| 5,224,277 A | | 7/1993 | Sang Do |
| 5,686,167 A | | 11/1997 | Rudy |
| 5,794,359 A | | 8/1998 | Jenkins et al. |
| 5,907,911 A | | 6/1999 | Huang |
| 6,038,790 A | | 3/2000 | Pyle et al. |
| 6,061,928 A | | 5/2000 | Nichols |
| 6,122,785 A | | 9/2000 | Bondie et al. |
| 6,158,149 A | | 12/2000 | Rudy |
| 6,192,606 B1 | | 2/2001 | Pavone |
| 6,294,114 B1 | * | 9/2001 | Muirhead .......... B29C 66/1312 264/40.6 |
| 6,298,581 B1 | | 10/2001 | Chern |
| 6,321,465 B1 | | 11/2001 | Bonk et al. |
| 6,397,498 B1 | | 6/2002 | Yoo |
| 6,582,786 B1 | | 6/2003 | Bonk et al. |
| 6,807,753 B2 | | 10/2004 | Steszyn et al. |
| 6,976,321 B1 | | 12/2005 | Lakic |
| 6,983,553 B2 | | 1/2006 | Lussier et al. |
| 7,565,754 B1 | | 7/2009 | Acheson et al. |
| 7,588,654 B2 | * | 9/2009 | Schindler ............... A43B 13/20 36/35 B |
| 7,591,919 B2 | | 9/2009 | Schindler et al. |
| 8,257,532 B2 | * | 9/2012 | Grange ................. B29C 66/131 156/289 |

| | | | |
|---|---|---|---|
| 8,650,775 B2 | | 2/2014 | Peyton |
| 9,119,439 B2 | | 9/2015 | Brandt et al. |
| 9,125,453 B2 | | 9/2015 | Keating et al. |
| 9,510,646 B2 | | 12/2016 | Holt |
| 9,609,912 B2 | | 4/2017 | Holt et al. |
| 10,016,017 B2 | | 7/2018 | Christensen et al. |
| 10,548,370 B2 | | 2/2020 | Walsh et al. |
| 10,709,199 B2 | | 7/2020 | Conway et al. |
| 10,856,607 B2 | | 12/2020 | Hatfield et al. |
| 2003/0144071 A1 | | 7/2003 | Dodge et al. |
| 2003/0226283 A1 | | 12/2003 | Braunschweiler |
| 2004/0154189 A1 | | 8/2004 | Wang |
| 2004/0237346 A1 | | 12/2004 | Rudy |
| 2005/0132617 A1 | | 6/2005 | Potter et al. |
| 2006/0277791 A1 | | 12/2006 | Schoenborn et al. |
| 2006/0277792 A1 | | 12/2006 | Schoenborn |
| 2007/0113425 A1 | | 5/2007 | Wakley et al. |
| 2008/0163512 A1 | | 7/2008 | Hazenberg |
| 2009/0019730 A1 | | 1/2009 | Salminen et al. |
| 2009/0117301 A1 | | 5/2009 | Lin |
| 2010/0005684 A1 | | 1/2010 | Nishiwaki et al. |
| 2014/0020264 A1 | | 1/2014 | Holt |
| 2014/0250720 A1 | | 9/2014 | Miner et al. |
| 2014/0305008 A1 | | 10/2014 | Wang et al. |
| 2015/0272271 A1 | | 10/2015 | Campos, II et al. |
| 2016/0051009 A1 | | 2/2016 | Kormann et al. |
| 2016/0075113 A1 | | 3/2016 | Chang et al. |
| 2016/0081428 A1 | | 3/2016 | Swigart et al. |
| 2016/0128424 A1 | | 5/2016 | Connell et al. |
| 2016/0361837 A1 | * | 12/2016 | Hayes ................... B29C 43/183 |
| 2017/0295886 A1 | | 10/2017 | Davis et al. |
| 2018/0035751 A1 | * | 2/2018 | Rehagen ............. A43B 13/181 |
| 2018/0303201 A1 | | 10/2018 | Greene |
| 2019/0231027 A1 | | 8/2019 | Eldem et al. |
| 2020/0022455 A1 | | 1/2020 | Eldem et al. |
| 2020/0305551 A1 | | 10/2020 | Campos, II et al. |
| 2020/0375308 A1 | | 12/2020 | Langvin et al. |
| 2021/0022440 A1 | | 1/2021 | Hurd et al. |
| 2021/0085023 A1 | | 3/2021 | Bandyopadhyay et al. |
| 2021/0145118 A1 | | 5/2021 | Campos, II et al. |
| 2021/0345729 A1 | | 11/2021 | Chan |
| 2021/0361027 A1 | | 11/2021 | Durflinger et al. |
| 2021/0368918 A1 | | 12/2021 | Lyke |
| 2022/0047040 A1 | | 2/2022 | Durflinger et al. |
| 2022/0061464 A1 | | 3/2022 | Chang et al. |
| 2022/0202136 A1 | | 6/2022 | Campos, II et al. |
| 2022/0248800 A1 | | 8/2022 | Lambertz |
| 2022/0312891 A1 | | 10/2022 | Yoshida |
| 2023/0301397 A1 | | 9/2023 | Campos, II et al. |
| 2024/0130473 A1 | | 4/2024 | Campos, II et al. |
| 2025/0000207 A1 | | 1/2025 | Anceresi et al. |

FOREIGN PATENT DOCUMENTS

| | | |
|---|---|---|
| DE | 3245182 A1 | 5/1983 |
| EP | 0298449 A2 | 1/1989 |
| EP | 0456434 A2 | 11/1991 |
| GB | 2235150 A | 2/1991 |
| KR | 100962004 B1 | 6/2010 |
| KR | 20110023173 A | 3/2011 |

OTHER PUBLICATIONS

Taiwanese Office Action and Search Report, ROC (Taiwan) Pat. Appln. No. 112140020, issues Jul. 11, 2024.

* cited by examiner

200

240a
240b 260a
260b

280a

280b

280c

280d

220a

220b

220c

220d

240c

240d

260c

260d

202

SYSTEMS AND METHODS FOR MANUFACTURING ARTICLES OF FOOTWEAR INCLUDING A SOLE STRUCTURE

CROSS-REFERENCE TO RELATED APPLICATION(S)

This application claims priority to U.S. Provisional Application No. 63/380,172, filed Oct. 19, 2022, U.S. Provisional Application No. 63/380,177, filed Oct. 19, 2022, U.S. Provisional Application No. 63/380,202, filed Oct. 19, 2022, U.S. Provisional Application No. 63/506,515, filed Jun. 6, 2023, U.S. Provisional Application No. 63/506,508, filed Jun. 6, 2023, the entireties of which are incorporated herein by reference.

FIELD

The present disclosure relates generally to systems and methods for manufacturing articles of footwear including sole structures and more particularly to systems and methods for manufacturing sole structures incorporating a fluid-filled bladder, such as a cushioning element.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outer sole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymeric foam material that compresses resiliently under an applied load to cushion the foot by attenuating ground-reaction forces. The midsole may additionally be coupled to or alternatively incorporate a fluid-filled bladder, such as cushioning elements, to increase the durability of the sole structure, as well as to provide cushioning to the foot by compressing resiliently under an applied load to attenuate ground-reaction forces. Generally, bladders are designed with an emphasis on balancing support for the foot and cushioning characteristics that relate to responsiveness as the bladder resiliently compresses under an applied load.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
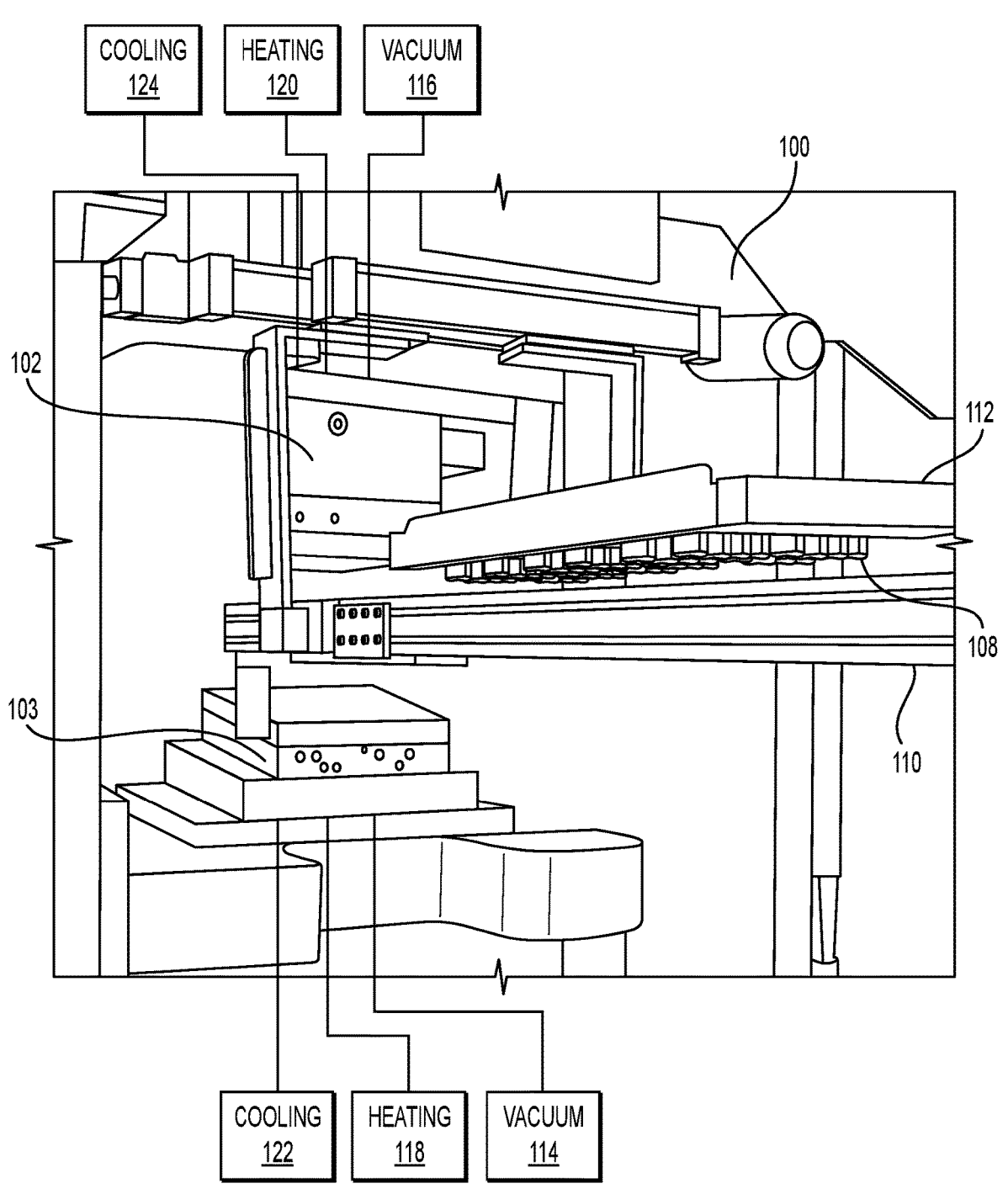
FIG. 1 is a perspective view of a system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/ or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In the discussion that follows, terms "about," "approximately," "substantially," and the like, when used in describing a numerical value, denote a variation of +/−10% of that value, unless specified otherwise.

The present disclosure is directed to a system for thermoforming a cushioning element or a plurality of cushioning elements, such as system 100 shown in FIG. 1, that improves the wall thickness uniformity of the cushioning elements and reduces the amount of material used during the thermoforming process.

FIG. 1 illustrates an exemplary thermoforming system 100 according to aspects disclosed herein. System 100 may include an upper mold portion 102 having a plurality of mold cavities, a lower mold portion 103 having a plurality of mold cavities, a first sheet, a second sheet, and a forming tool 108 having a plurality of protrusions. As will be discussed in further detail below, by using forming tool 108 and/or by uniquely configuring its protrusions within the mold cavities of upper mold portion 102 or lower mold portion 103, system 100 may be capable of forming a cushioning element or a plurality of cushioning elements that possess improved wall thickness uniformity and/or that include less material than conventional cushioning elements.

System 100 may further include a sheet feeder or conveyor system 110 for introducing first and second sheets between the upper mold portion 102 and lower mold portion 103 during thermoforming and for transporting the formed sheets (i.e., the cushioning element(s)) out of the mold portions 102, 103 after processing.

In some cases, system 100 may be a robot-controlled thermoforming system and may further include at least one robotic arm, such as robotic arm 112. The robotic arm 112 may be capable of configuring forming tool 108 (including its protrusions) into a set position in upper mold portion 102 or lower mold portion 103 during the thermoforming process. Robotic arm 112 may further include end-of-arm tooling that may be configured to hold forming tool 108. In cases where end-of-arm tooling is used, the end-of-arm tool may be custom designed and/or specifically selected to ensure that forming tool 108 is precisely positioned within the mold cavities of the upper mold portion 102 or lower mold portion 103 as desired.

System 100 may further include one or more vacuum systems, one or more heating systems, and/or one or more cooling systems to facilitate the thermoforming process. The vacuum system(s) may be used to expose first and second sheets to a negative pressure (e.g., below atmospheric pressure). This pressure differential further enables system 100 to shape sheets into a desired shape for the cushioning element(s). As shown in FIG. 1, a vacuum system 114 may be coupled to upper mold portion 102 so as to cause sheet to be drawn into one or more mold cavities of upper mold portion 102, or a vacuum system 116 may be coupled to lower mold portion 103 so as to cause sheet to be drawn into one or more mold cavities of lower mold portion 103. Vacuum systems suitable for use in system 100 are known in the art.

The heating system(s) 118, 120 may be used to expose sheets to thermal energy (e.g., from about 125° C. to about 225° C., such as about 145° C. to about 205° C., or about 165° C. to about 185° C.) so as to render sheets pliable (i.e., by raising the temperature of the sheets) for forming into the cushioning element(s). If system 100 includes one or more heating systems, the heating system(s) 118, 120 may be positioned as desired within system 100, for example, positioned above upper mold portion 102 or for example, positioned below lower mold portion 103, as shown in FIG. 1. The heating system(s) 118, 120 may also be used to expose forming tool 108 to thermal energy, and in some cases, this exposure may improve the thermoforming of the cushioning element(s) and/or the ability of forming tool 108 to process first and/or second sheets. Heating systems suitable for use are known in the art.

The cooling system(s) 122, 124 may be used to lower and/or maintain the temperature of certain components of system 100. If system 100 includes one or more cooling systems, the cooling system(s) 122, 124 may be positioned as desired within system 100, for example, positioned above upper mold portion 102 or for example, positioned below lower mold portion 103, as shown in FIG. 1. The cooling system(s) 122, 124 may also be used to lower the temperature of forming tool 108, and in some cases, this exposure may improve the thermoforming of the cushioning element(s) and/or the ability of forming tool 108 to process first and/or second sheets. Cooling systems suitable for use are known in the art.

In addition to the foregoing, system 100 may further include one or more additional components and/or systems, such as, but not limited to monitoring devices, external heating or cooling systems, hydraulic systems, safety mechanisms, or any other components and/or systems that would be incorporated into a single sheet or twin sheet thermoforming system to ensure efficient and reliable operation.

In some aspects, the system of the present disclosure includes a forming tool, such as forming tool 108 shown in FIG. 1. In some aspects, the system herein includes only one forming tool or may include a plurality of forming tools. Any suitable forming tool for a thermoforming process may be used. In some cases, however, the forming tool may include a base layer and a plurality of protrusions extending therefrom. In these cases, each protrusion may correspond to at least one cushioning element. That is, the number, arrangement, and/or shape of the protrusions may be the same as the number, arrangement, and/or shape of the mold cavities of the upper or lower mold portions of the system. As will be discussed in further detail below, the number, arrangement, and/or shape of the distinct sets of corresponding mold cavities between the mold portions directly correspond to the number, arrangement, and/or shape of the cushioning element(s) formed during the thermoforming process.

The number of protrusions on the forming tool may be in a range of from 1 protrusions to 40 protrusions, such as 8 protrusions to 32 protrusions, or 16 protrusions to 24 protrusions. The number of protrusions on a forming tool may be at least 4, at least 6, at least 8, at least 10, at least 12, at least 14, at least 16, at least 18, at least 20, at least 22, at least 24, at least 26, at least 28, at least 30, at least 32, at least 34, at least 36, at least 38, or at least 40 protrusions.

Figure 2A:
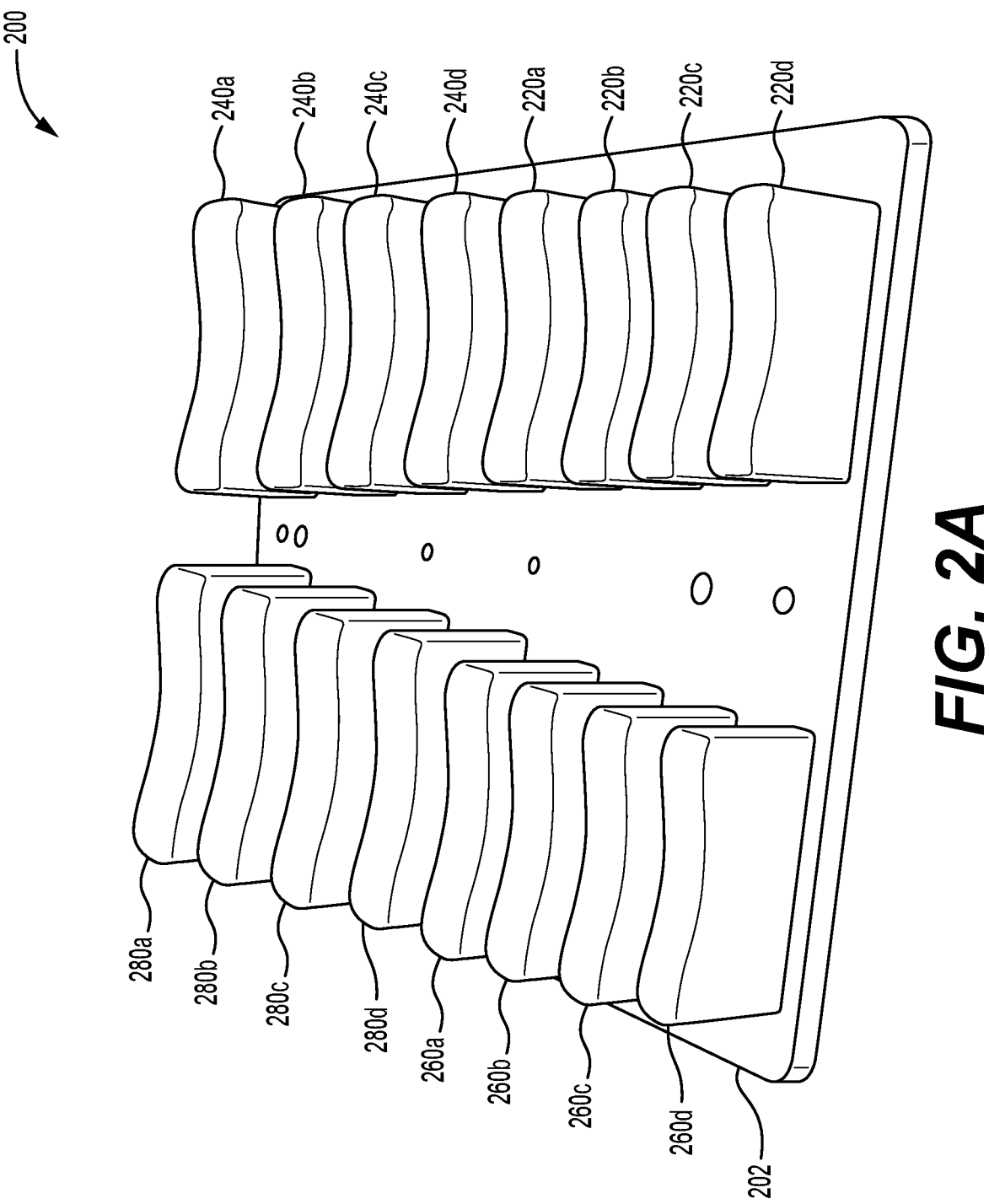
FIGS. 2A-2F show images of various forming tools according to the present disclosure.
Figure 2B:
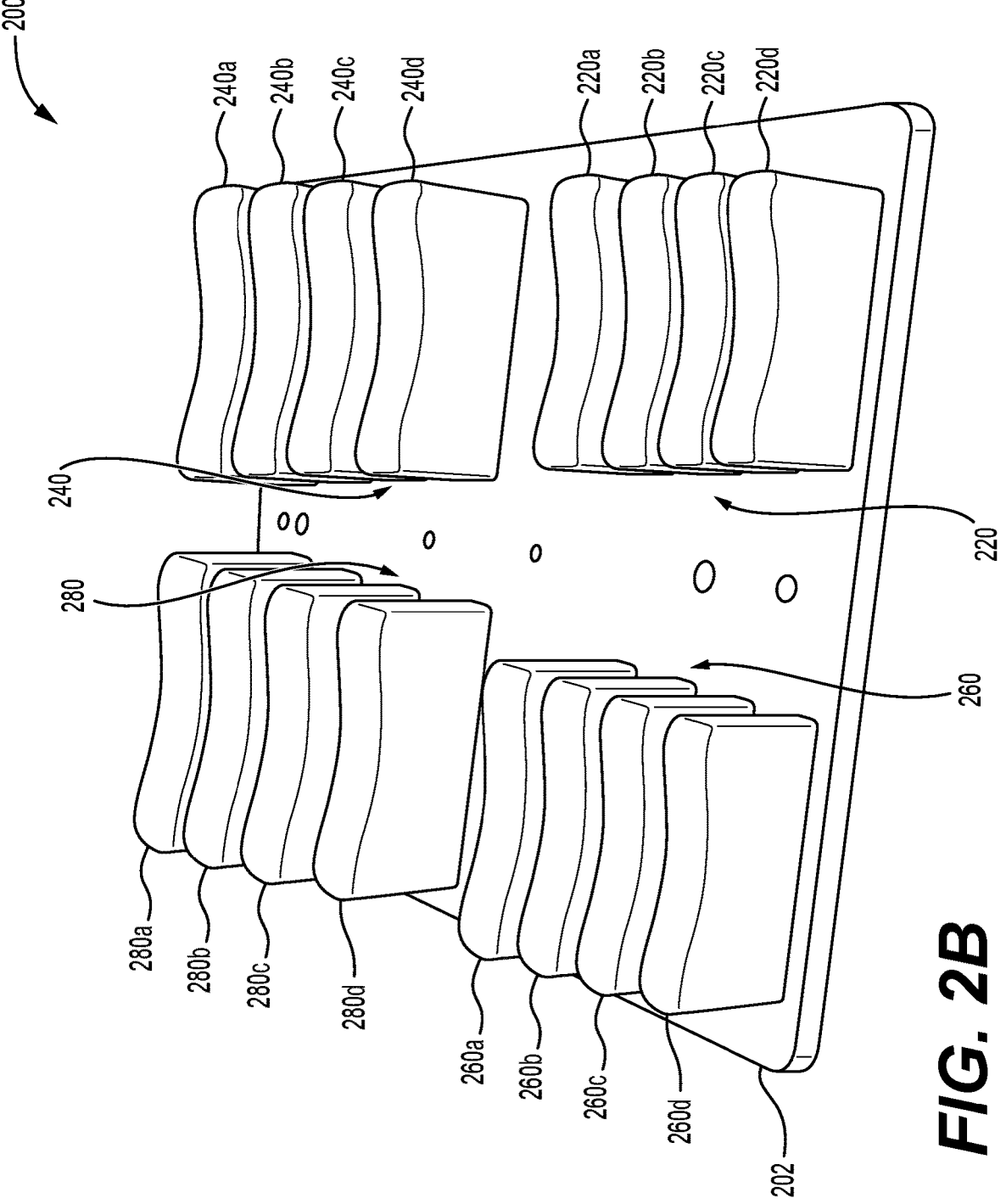
Figure 2C:
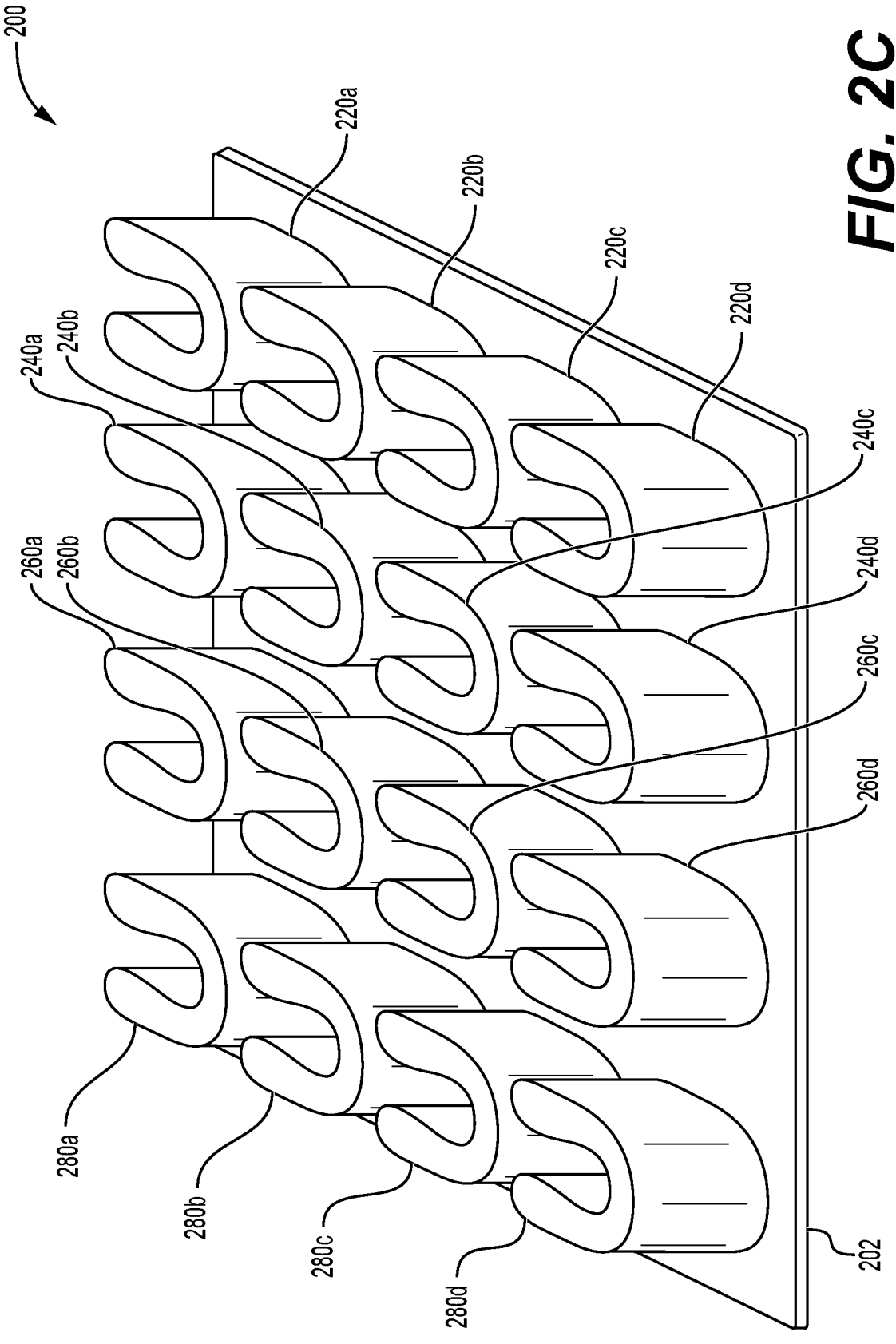
Figure 2D:
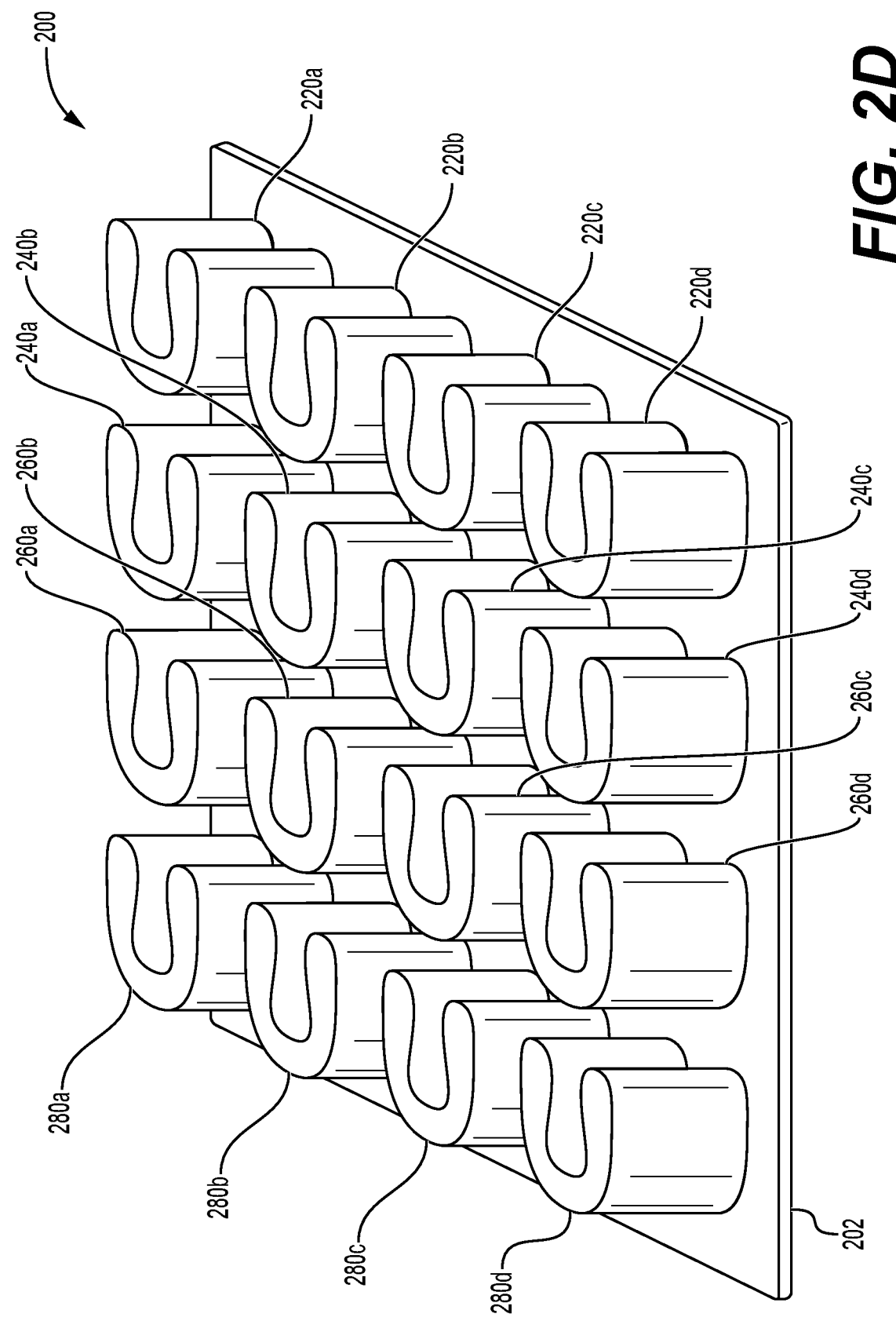
Figure 2E:
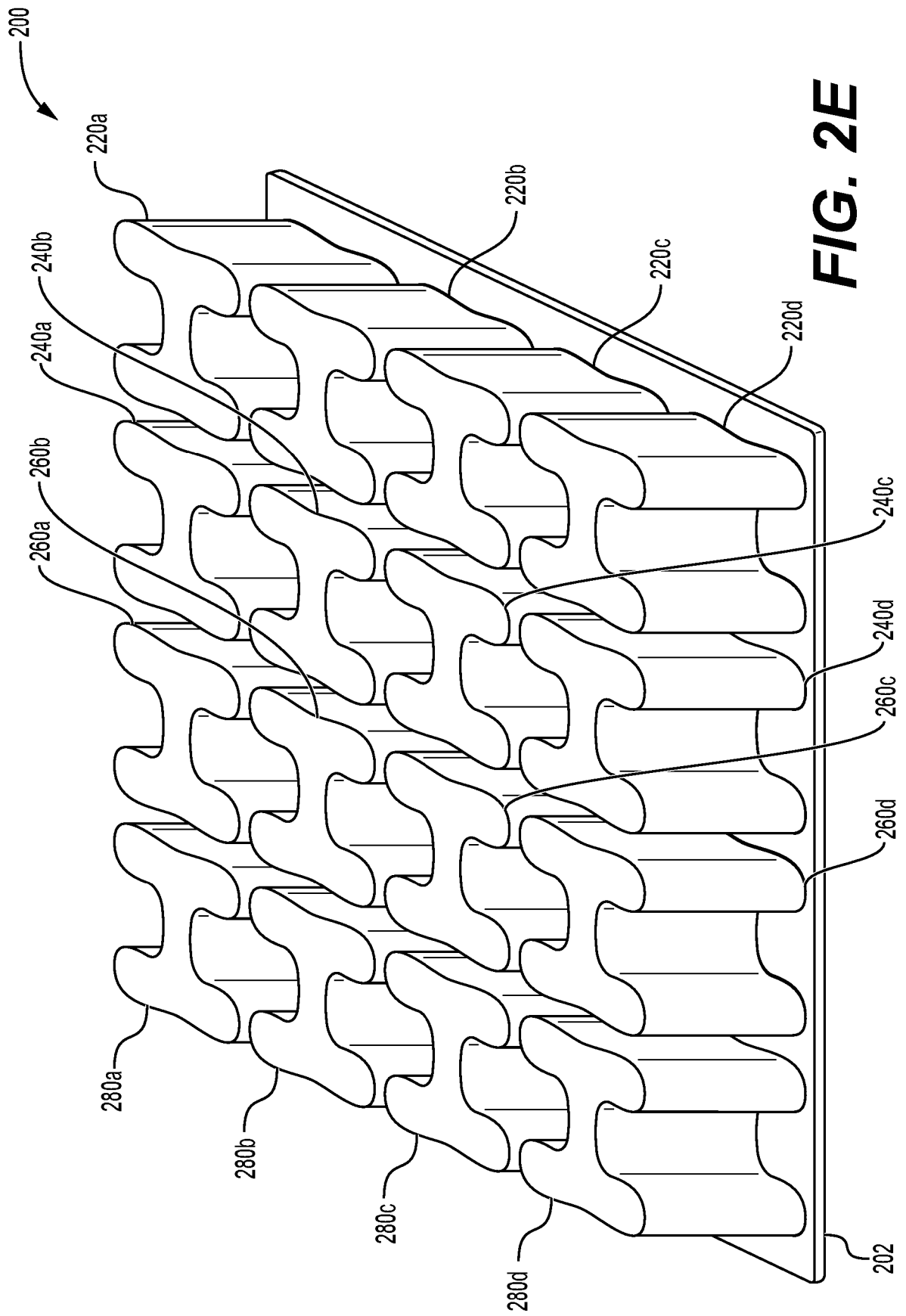
Figure 2F:
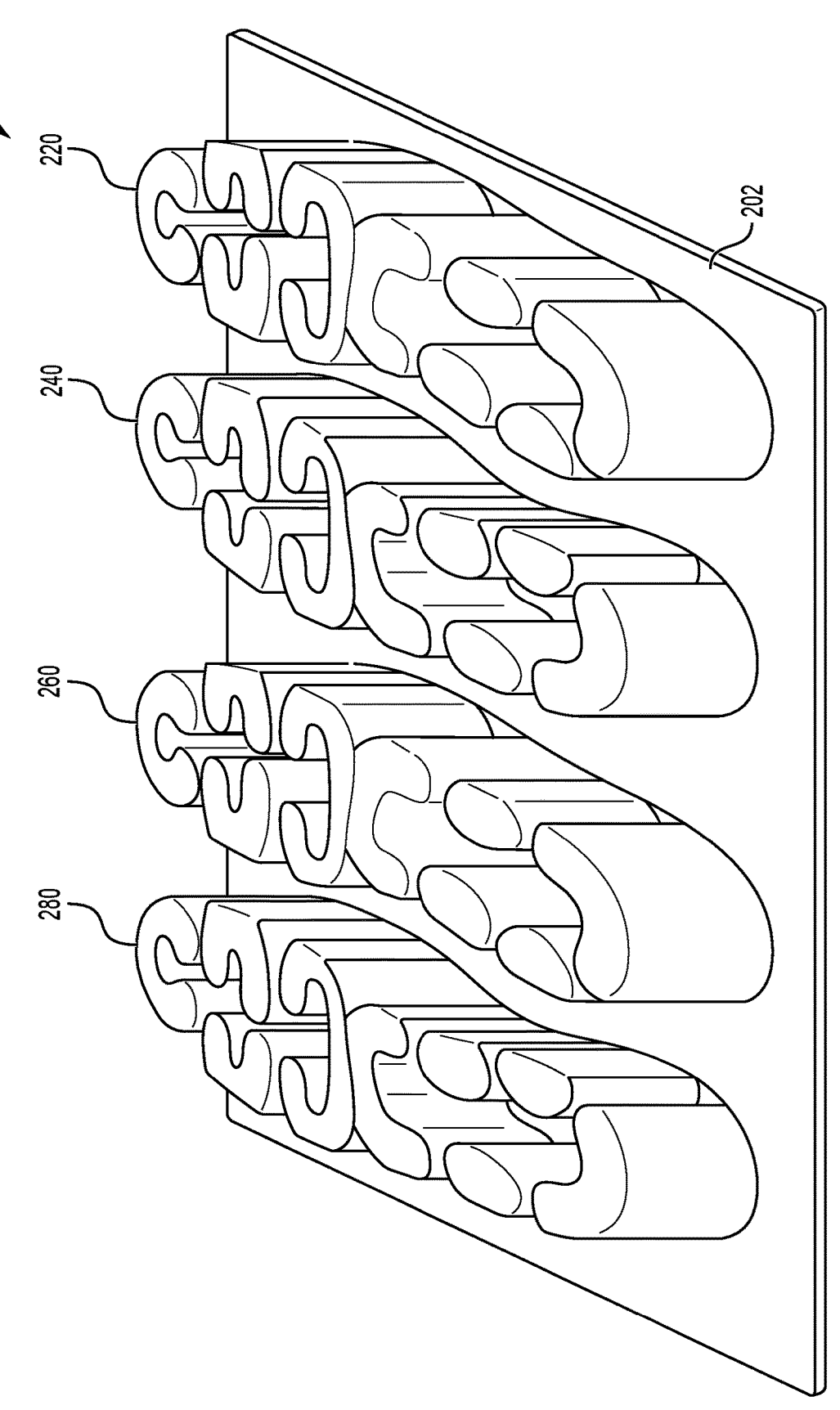

Regardless of the number of protrusions, in some cases, each of the plurality of protrusions may be arranged (e.g., spaced apart, grouped together in zones, etc.) on the forming tool in any manner, and in some cases, may be arranged in view of the arrangement of the mold cavities of the mold portions 102, 103. For example, FIG. 2A illustrates an exemplary forming tool, forming tool 200, which includes base layer 202 and protrusions 220a-280d spaced apart on the tool 200, but not arranged in zones. In other examples, the forming tool may include a plurality of zones that each comprise two or more protrusions, and in some cases, these zones may further enable the thermoforming system to simultaneously form the plurality of cushioning elements. FIG. 2B also illustrates an exemplary forming tool, forming tool 200, which includes base layer 202 and protrusions 220a-280d arranged in zones 220, 240, 260, and 280 on the tool 200.

Regardless of the number or arrangement of the protrusions, in some cases, each of the plurality of protrusions may have an irregular, three-dimensional shape, such as a tube shape or a shape that corresponds to a sole structure of a shoe. The tube shape may be, but is not limited to, a rectangular tube shape, a U-shaped tube, an L-shaped tube, and/or an H-shaped tube. FIGS. 2C through 2F illustrate exemplary forming tools including protrusions having various arrangements, numbers, and/or shapes.

Regardless of the number, arrangement, and/or shape of the protrusions, in some cases, the plurality of protrusions may be uniformly designed to include one or more characteristics (e.g., length, widths, heights, curvatures, grooves, depressions, etc.) so that each protrusion is identical to each other. In other cases, the plurality of protrusions may be individually designed to include one or more characteristics so that at least one protrusion is different from another protrusion.

In some cases, the length of protrusions may be in the range of from 4 cm to 10 cm, such as 5 cm to 9 cm, or 6 cm to 8 cm. In some cases, the width of protrusions may be in the range of from 4 cm to 10 cm, such as 5 cm to 9 cm, or 6 cm to 8 cm. In some cases, the height of protrusions may be in the range of from 1.5 cm to 8 cm, such as 3 cm to 6.5 cm, or 4.5 cm to 5 cm.

Figure 3A:
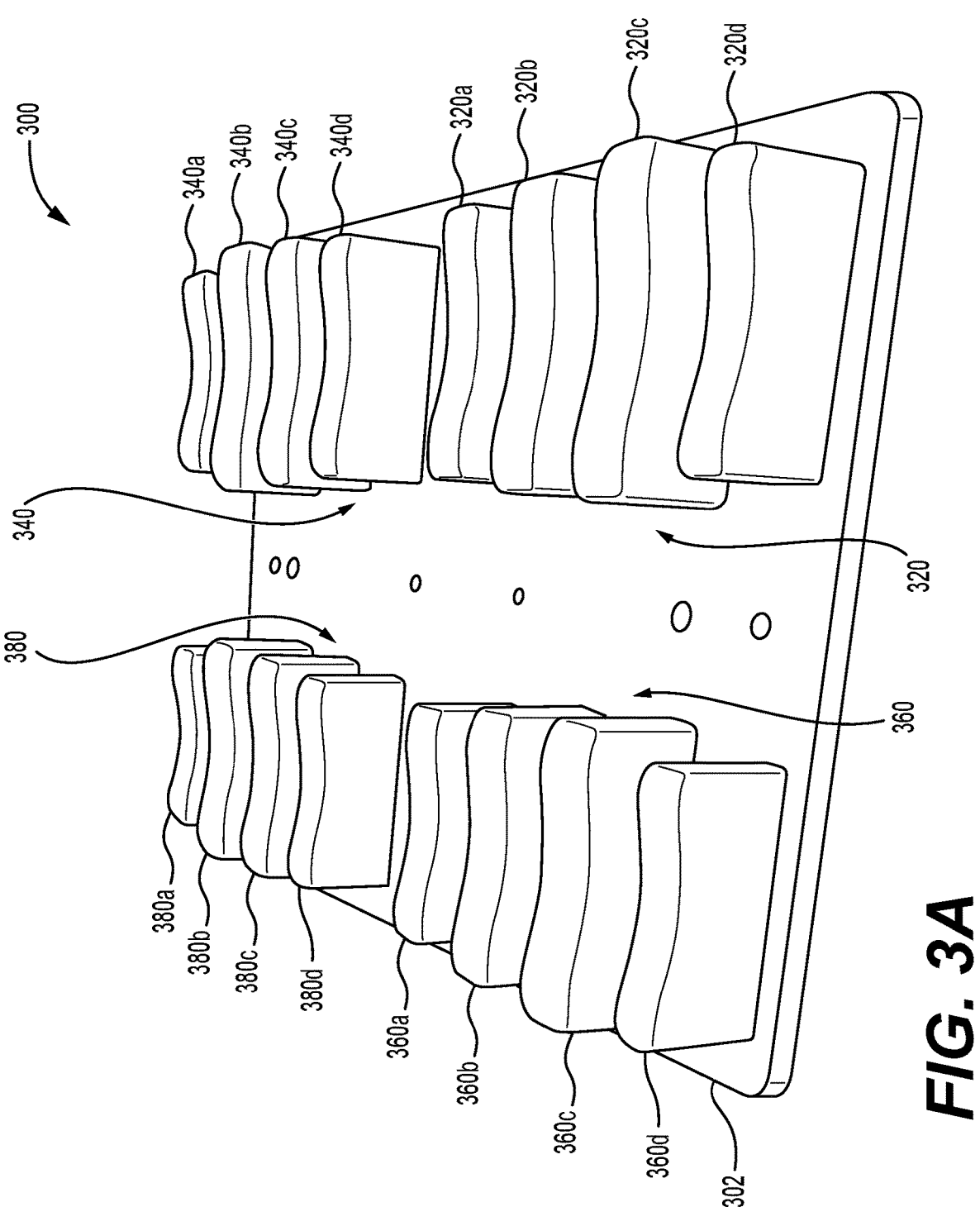
FIG. 3A shows an image of a forming tool according to the present disclosure.
Figure 3B:
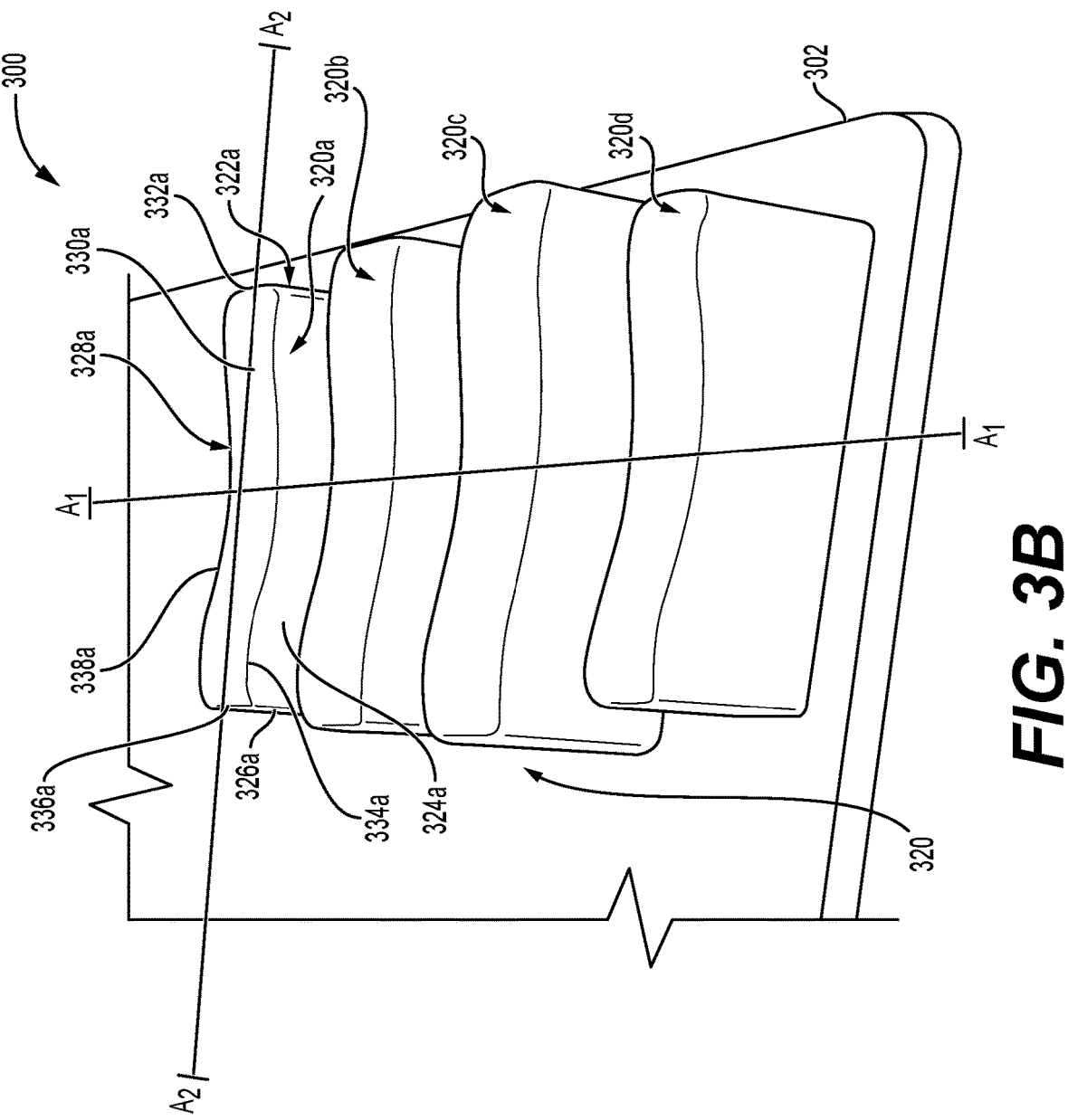
FIG. 3B is a perspective view of a zone of the forming tool of FIG. 3A.

FIG. 3A illustrates forming tool 300 that includes base layer 302 and a plurality of protrusions 320a-380d, with each having a substantially rectangular tube shape, each being individually designed to include one or more characteristics, and each being arranged in zones 320, 340, 360, and 380 on forming tool 300. FIG. 3B provides a detailed and close-up view of zone 320 of forming tool 300 of FIG. 3A.

In zone 320, protrusions 320a, 320b, 320c, and 320d are arranged on the base layer 302 so that a space may be disposed between protrusions 320a and 320b, a space may be disposed between protrusions 320b and 320c, and a space may be disposed between protrusions 320c and protrusions 320d. The width of each of these spaces may be uniform, or in some cases, the width of each of these spaces may be varied. Regardless of whether the spaces are uniform or varied, the width of spaces may be in the range of from 0.5 cm to 4 cm, such as 1.5 cm to 3 cm.

Protrusions 320a, 320b, 320c, and 320d may have uniform or different heights, widths, and lengths with respect to each other, and in some cases, these heights, widths, and lengths may be optimized or designed in view of the mold cavities and/or the plurality of cushioning elements. For example, to create a plurality of cushioning elements having a varied lengths, the length of protrusions 320a and 320d may be longer than the lengths of protrusions 320b and 320c, or vice versa.

Turning now to protrusion 320a, protrusion 320a includes four side surfaces 322a, 324a, 326a, 328a and an outermost surface 330a that faces away from the base layer 302 of the forming tool and comprises four edges 332a, 334a, 336a, 338a. As shown, each side surface 322a, 324a, 326a, 328a is substantially aligned with and corresponds to exactly one edge 332a, 334a, 336a, 338a of the outermost surface 330a.

In some cases, protrusion 320a may be centered along a longitudinal axis $A_1$-$A_1$ of zone 320, so that outermost surface 330a of protrusion 320a may extend symmetrically in along a latitudinal axis $A_2$-$A_2$. In these cases, the outermost surface 330a may further include two end portions and a central portion located between the two end portions, for example, at the intersection of axes $A_1$-$A_1$ and $A_2$-$A_2$.

Along outermost surface 330a, protrusion 320a may extend from base layer 302 to have a uniform height or may extend from base layer 302 to have a varied height. In cases where protrusion 320a has a varied height along outermost surface 330a, protrusion 320a may undulate or curve along latitudinal axis $A_2$-$A_2$ so that the central portion of outermost surface 330a may be concave or convex relative to base layer 302. That is, due to the central region being concave or convex, the two end portions of outermost surface 330a, of which are proximal to edges 332a and 336a of the outermost surface and correspond to side surface 322a and 326a, are divergent to the center portion.

It should be understood that the discussion above relative to zone 310 and/or protrusion 320a is applicable to any zone, protrusion, surface, and/or edge of the forming tool as described herein, and each zone, protrusion, surface, and/or edge of the forming tool may be independently optimized. That is, each of these individual components of the forming tool may be optimized separately without being dependent on the optimization of another component.

The material of the forming tool may be selected in view of the barrier film(s) used and/or the desired thermoforming process procedures. That is, forming tool 108 may be formed from a commercially available plug assist material(s) that is optimized for single sheet and/or twin sheet plug assist thermoforming. For example, the commercially available plug assist material may include one or more materials, such as a polymeric material or a material including one or more metals. In some cases, the commercially available plug assist material may have a density in a range of from about 50 lb/ft$^3$ (800.923 kg/m$^3$) to about 60 lb/ft$^3$ (961.108 kg/m$^3$), and/or have a thermal conductivity of about 0.10 BTU/hr-ft-° F. (0.17 W/m° K). In some cases, the commercially available plug assist material may have a coefficient of thermal expansion of about 20×10-6 in/in/° F. (36×10-6 m/m/° C.) and/or have a compressive strength in a range of from about 13,000 psi (about 89 MPa) to about 14,000 psi (about 97 MPa), such as about 13,250 psi (about 91 MPa) to about 13,750 psi (about 95 MPa), or about 13,400 psi (about 92 MPa) to about 13,600 psi (about 94 MPa). In some cases, the commercially available plug assist material may have a service temperature in a range of from about 300° F. (about 148° C.) to about 400° F. (about 205° C.), such as about 325° F. (about 162° C.) to about 375° F. (about 190° C.), or about 340° F. (about 171° C.) to about 360° F. (about 182° C.). As used herein, the term "service temperature" refers to the highest temperature the commercially available plug assist material can be used, for prolonged period, without significant change in properties. The commercially available plug assist material may be most compatible or may exhibit enhanced performance with barrier films comprising multi-layers and/or with barrier films comprising crystallized polyethylene terephthalate (CPET), polyethylene terephthalate (PET), ethylene vinyl alcohol (EVOH), low-density polyethylene (LDPE), thermoplastic polyurethane (TPU), and/or combinations thereof. In some examples, the commercially available plug assist material may comprise, consist essentially of, or consist of HYTAC® FLXT syntactic foam manufactured by CMT Materials, LLC (Attleboro, MA).

Figure 4A:
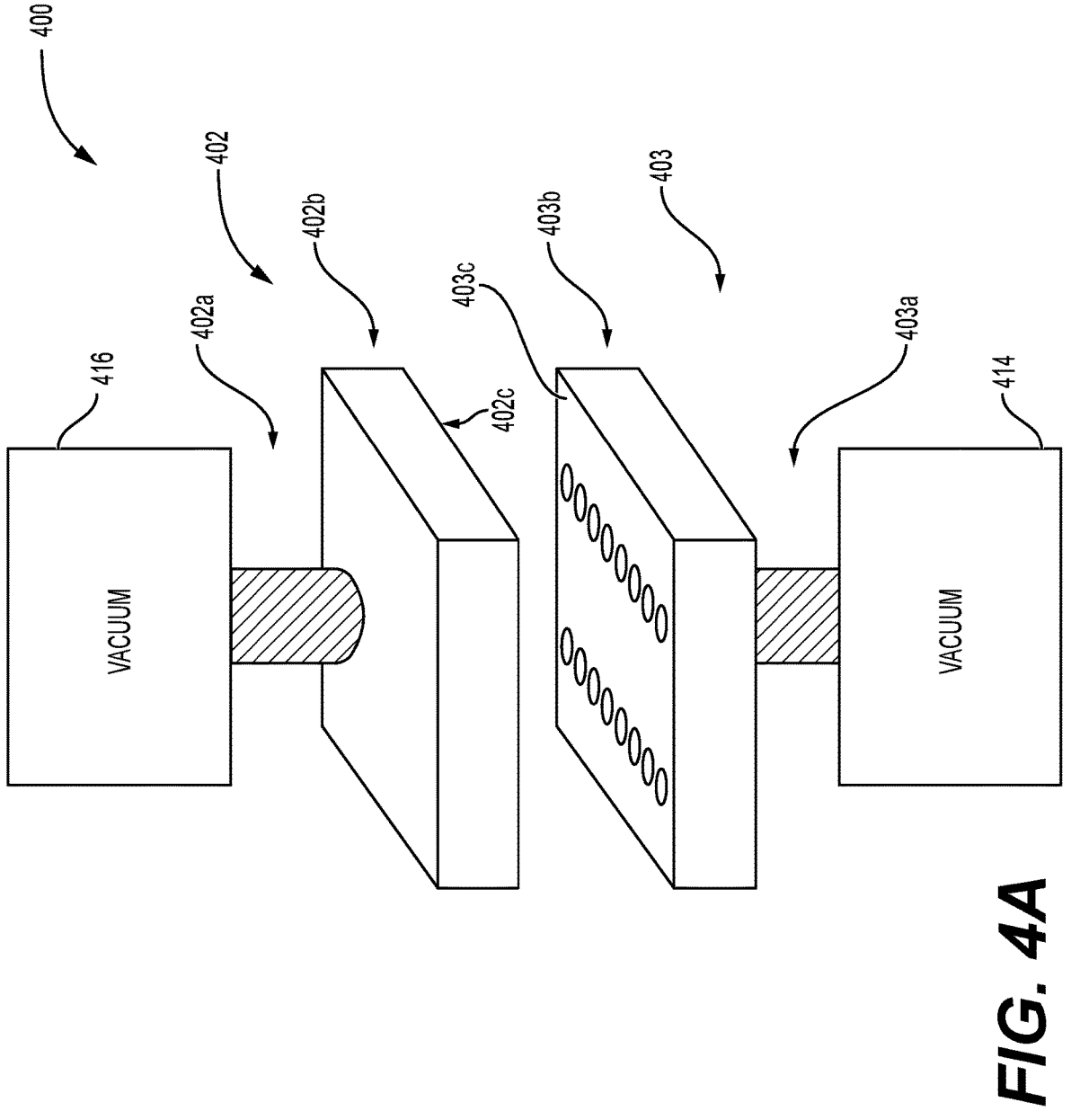
FIG. 4A is a perspective view of an upper mold portion and a lower mold portion for use in the system of FIG. 1.

In some aspects, the system of the present disclosure includes mold portions, such as upper mold portion 102 and lower mold portion 103 shown in FIG. 1. FIG. 4A illustrates mold portions 402, 403 that may be used in the thermoforming system of FIG. 1. Upper mold portion 402 may include a upper portion 402a and a lower portion 402b having a flat or substantially flat bottom surface 402c, and lower mold portion 403 may include a lower portion 403a and a upper portion 403b having a flat or substantially flat top surface 403c that faces the bottom surface 402c of the upper mold portion. Bottom surface 402c and top surface 403c may each include a plurality of mold cavities disposed therein. In some cases, the upper portion 402a of upper mold portion 402 and/or the lower portion 403a of lower mold portion 403 may be coupled to a negative pressure source, such as vacuum systems 414, 416, to cause sheets (not shown) to be drawn into one or more mold cavities of upper and lower mold portions 402, 403, respectively.

Figure 4B:
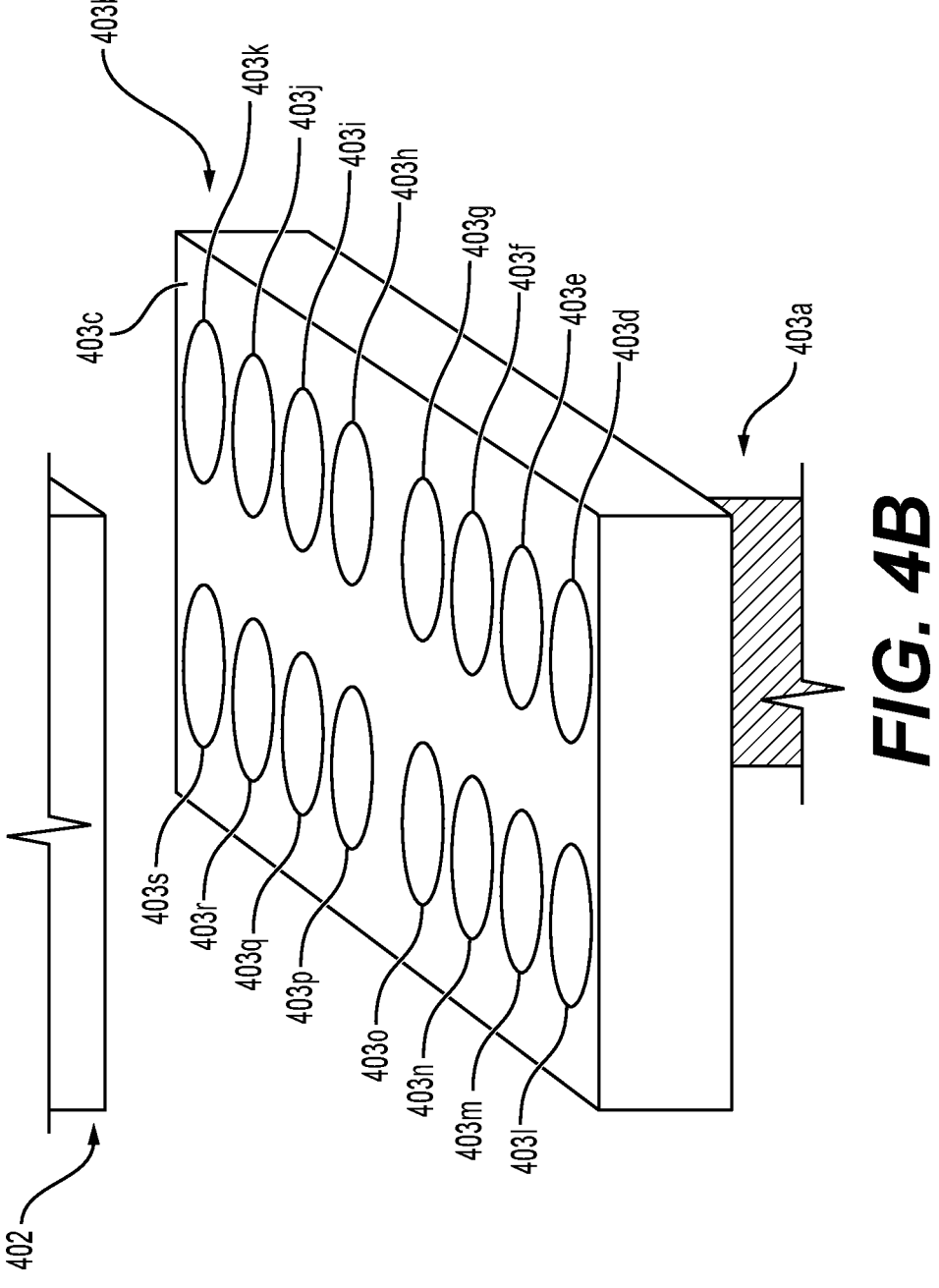
FIG. 4B is a perspective view of a lower mold portion for use in the system of FIG. 1.
Figure 8:
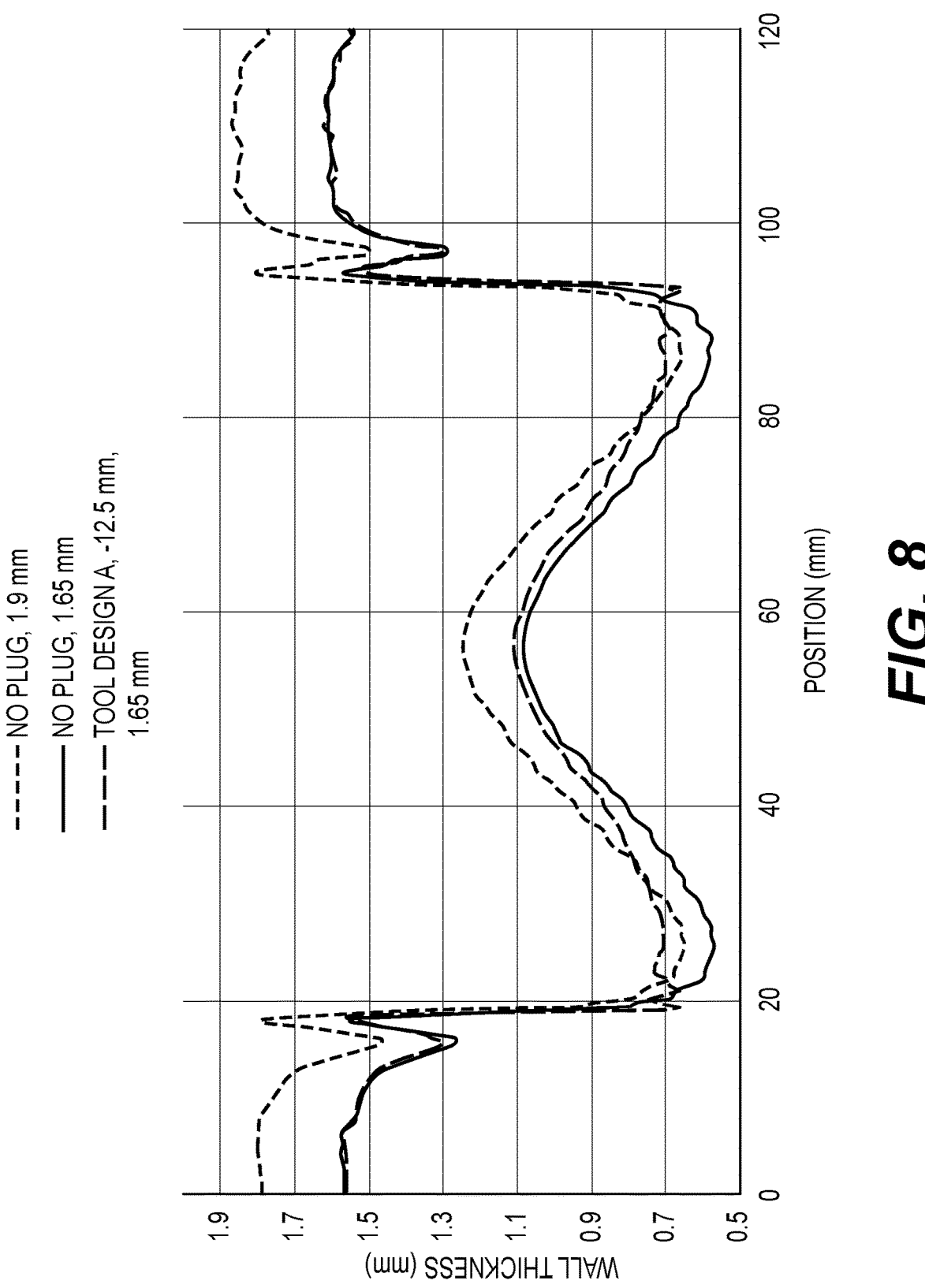
FIG. 8 includes a line graph illustrating a series of wall thickness measurements at various positions of two cushioning elements formed without a forming tool as compared to a series of wall thickness measurements at various positions of a cushioning element formed according to the systems and/or methods of the present disclosure.
Figure 9:
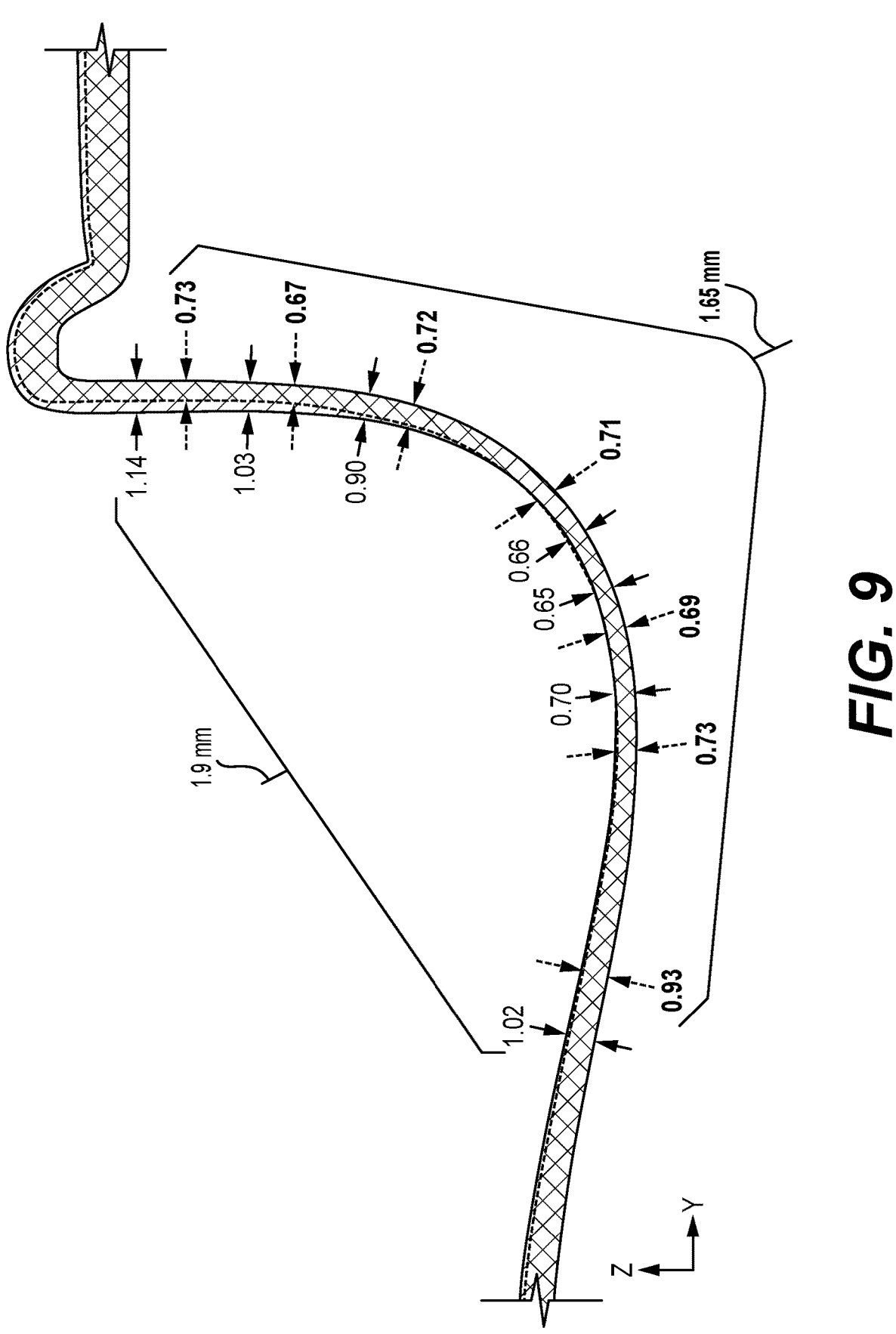
FIG. 9 is a cut away view of cushioning elements formed with and without a forming tool according to the present disclosure, each annotated with respective wall thickness measurements at various positions of each cushioning element.
Figure 10:
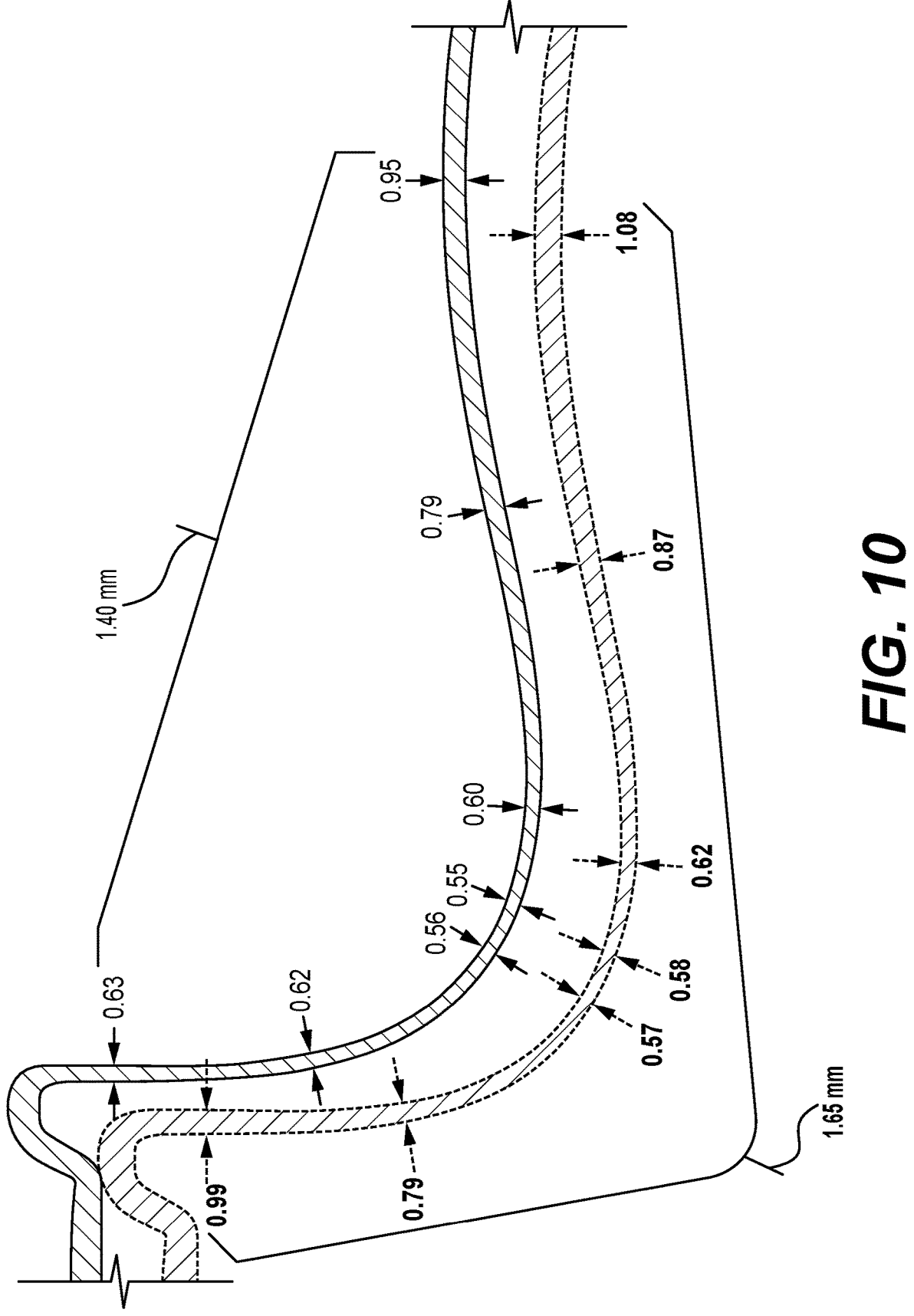
FIG. 10 is a cut away view of other cushioning elements formed with and without a forming tool according to the present disclosure, each annotated with respective wall thickness measurements at various positions of each cushioning element.
Figure 11:
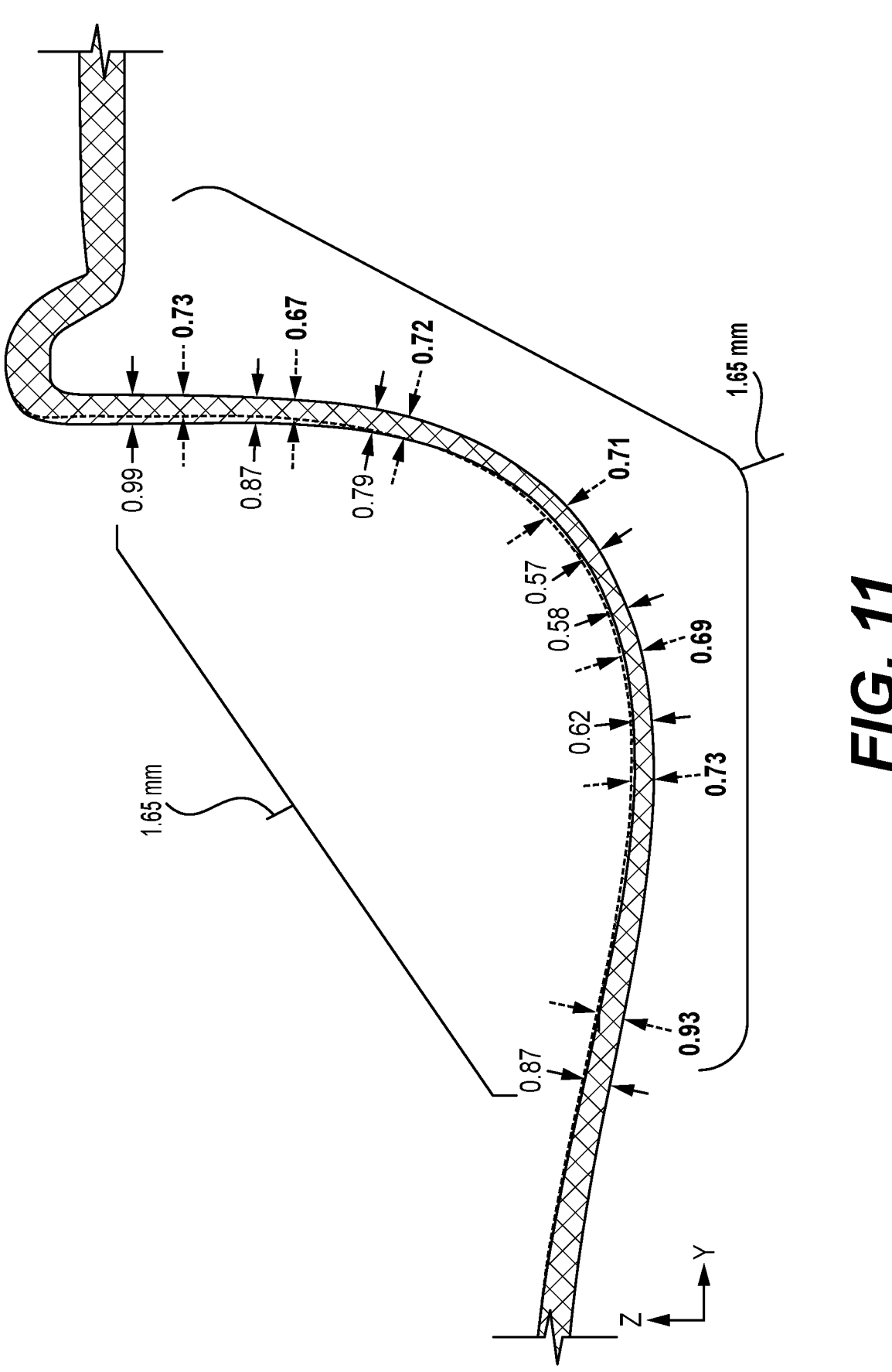
FIG. 11 is a cut away view of other cushioning elements formed with and without a forming tool according to the present disclosure, each annotated with respective wall thickness measurements at various positions of each cushioning element.

In some cases, when the upper and lower mold portions are in a closed configuration during the thermoforming process, bottom surface 402c of the upper mold portion 402 may align with top surface 403c of the lower mold portion 403. This alignment enables one mold cavity of the upper mold portion 402 to correspond to one mold cavity of the lower mold portion 403. That is, the alignment of the upper and lower mold portions 402, 403 forms distinct sets of corresponding mold cavities between the mold portions 402, 403. In these cases, one distinct set of corresponding mold cavities corresponds to one cushioning element. That is, the number, arrangement, shape, and/or characteristics of the distinct sets of corresponding mold cavities directly corresponds to the number, arrangement, shape, and/or characteristics of the cushioning element(s). For example, FIG. 4B provides a top view of top surface 403c of lower mold portion 403 of FIG. 4A. As shown, top surface 403c includes sixteen mold cavities 403d-403s, which align with the eight mold cavities of the bottom surface (not shown) to create sixteen distinct sets of corresponding mold cavities between upper and lower mold portions 402, 403. These sixteen distinct sets of corresponding mold cavities may form the cushioning elements shown in FIG. 8.

Bottom surface 402c and top surface 403c may include 1 mold cavity to 40 mold cavities, such as 8 mold cavities to 36 mold cavities, or 12 mold cavities to 24 mold cavities. Bottom surface 402c and top surface 403c may include at least 1, at least 2, at least 4, at least 6, at least 8, at least 10, at least 12, at least 14, at least 16, at least 18, at least 20, at least 22, at least 24, at least 26, at least 28, at least 30, at least 32, at least 34, at least 36, at least 38, or at least 40 mold cavities.

Regardless of the number of mold cavities, in some cases, each of the plurality of mold cavities may be arranged (e.g., spaced apart, grouped together) on the upper mold portion 402 or lower mold portion 403 in any manner, and in some cases, may be arranged to correspond with the protrusions on the forming tool. For example, 16 mold cavities may be arranged on the bottom surface 402c or the top surface 403c in a 4 mold cavity by 4 mold cavity configuration, or for example, 24 mold cavities may be arranged the bottom surface 402c or the top surface 403c in a 4 mold cavity by 6 mold cavity configuration (or vice versa in a 6 mold cavity by 4 mold cavity configuration).

Regardless of the number or arrangement of the mold cavities, in some cases, each of the plurality of mold cavities may have an irregular shape, such as a partial tube shape or a shape that corresponds to a sole structure of a shoe. The partial tube shape may be, but is not limited to, a partial cylindrical tube shape, a partial rectangular tube shape, a partial U-shaped tube, a partial L-shaped tube, and/or a partial H-shaped tube. In other cases, an innermost surface of the mold cavity may have an undulating curvature, and in some examples, that corresponds to the forming tool or protrusions on the forming tool as discussed above with respect to FIGS. 3A-3B.

In some aspects, the system of the present disclosure includes two sheets, such as first sheet 504 and second sheet 506 shown in FIGS. 5A-5K. The sheets may have various thicknesses (measured by sheet gauge), which may be selected in view of the desired thickness of the cushioning elements. In some examples, the first sheet may have a greater thickness than a thickness of the second sheet, or in another examples, the second sheet may have a greater thickness than a thickness of the first sheet. It is also contemplated that the first sheet may have a thickness that is equal to a thickness of the second sheet. In some examples, the first sheet and/or the second sheet may have a sheet gauge of about 20 thou (0.508 millimeters) to about 90 thou (2.286 millimeters), such as about 35 thou (0.889 millimeters) to about 75 thou (1.905 millimeters), or about 50 thou (1.270 millimeters) to about 60 thou (1.524 millimeters). In other examples, the first sheet and/or the second sheet may have a sheet gauge of less than about 90 thou (2.286 millimeters), less than about 85 thou (2.159 millimeters), less than about 80 thou (2.032 millimeters), less than about 75 thou (1.905 millimeters), less than about 70 thou (1.778 millimeters), less than about 65 thou (1.651 millimeters), less than about 60 thou (1.524 millimeters), less than about 55 thou (1.397 millimeters), less than about 50 thou (1.270 millimeters), less than about 45 thou (1.143 millimeters), less than about 40 thou (1.016 millimeters), less than about 35 thou (0.889 millimeters), less than about 30 thou (0.762 millimeters), less than about 25 thou (0.635 millimeters), or less than about 20 thou (0.508 millimeters). As used herein, the term "thou" refers to a thousandth of an inch, i.e., 0.001 inch (0.0254 millimeters).

The system of the present disclosure may be configured to use the above-described components to form the cushioning element(s). For example, during the thermoforming process, the system may be configured to introduce the first sheet between the upper and lower mold portions, to introduce the forming tool between the upper and lower mold portions at a set position relative to the mold cavities of the lower mold portion, to press the forming tool into the first sheet, and to introduce the second sheet between the upper mold portion and the lower mold portion. In some cases, after the second sheet is introduced, the system may be further configured to position a second forming tool between the upper and lower mold portions at a set position relative to the mold cavities of the upper mold portion and to press the second forming tool into the second sheet. It will be appreciated that, in other examples, the system may be configured to introduce the first and second sheets simultaneously or sequentially between the upper and lower mold portions or may be configured to perform steps associated with forming the second sheet before steps associated with forming the first sheet.

FIGS. 5A-5K illustrate these exemplary configurations of the system, system 500, at various stages of the thermoforming process according to one embodiment of the present disclosure.

Figure 5A:
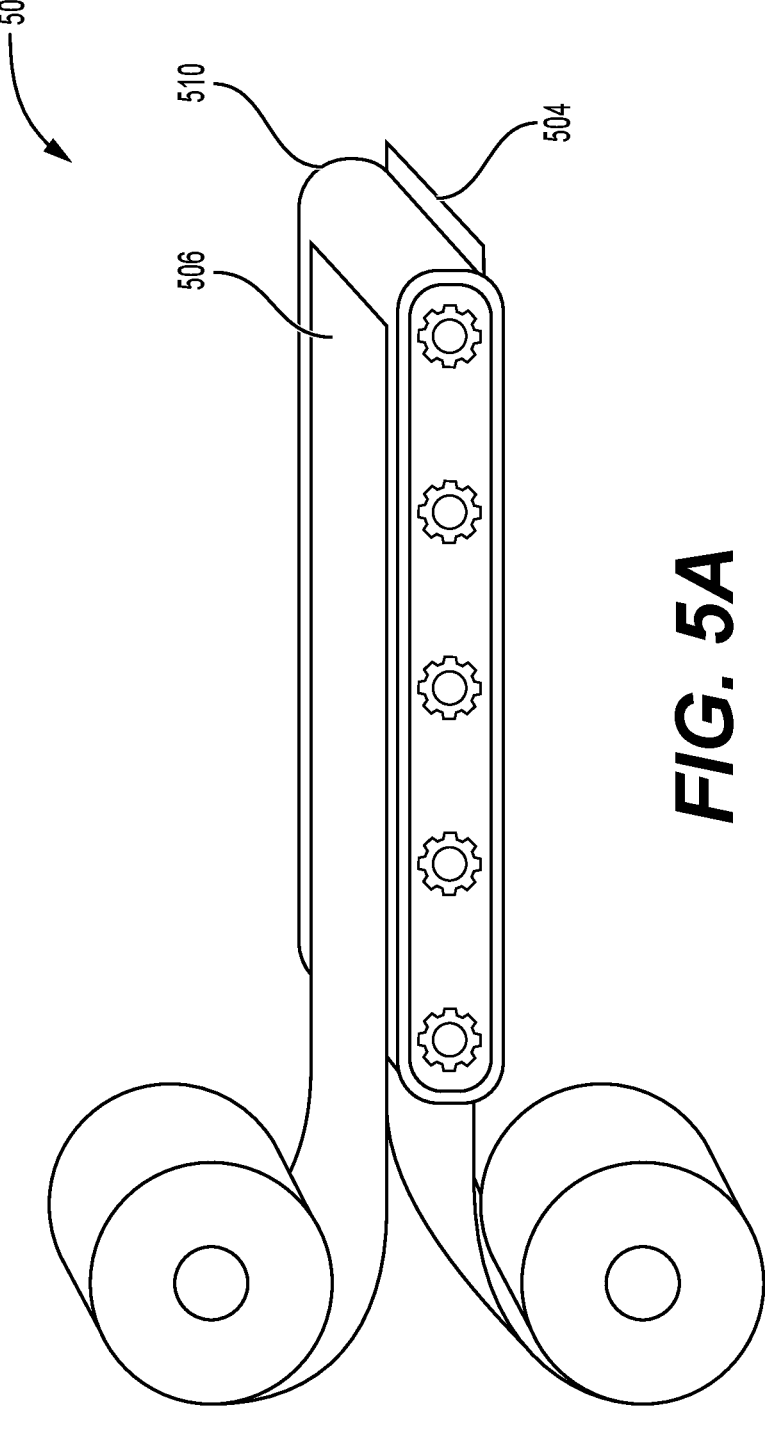
FIGS. 5A-5K show configurations and aspects of the system of FIG. 1 at various stages of the thermoforming process.
Figure 5B:
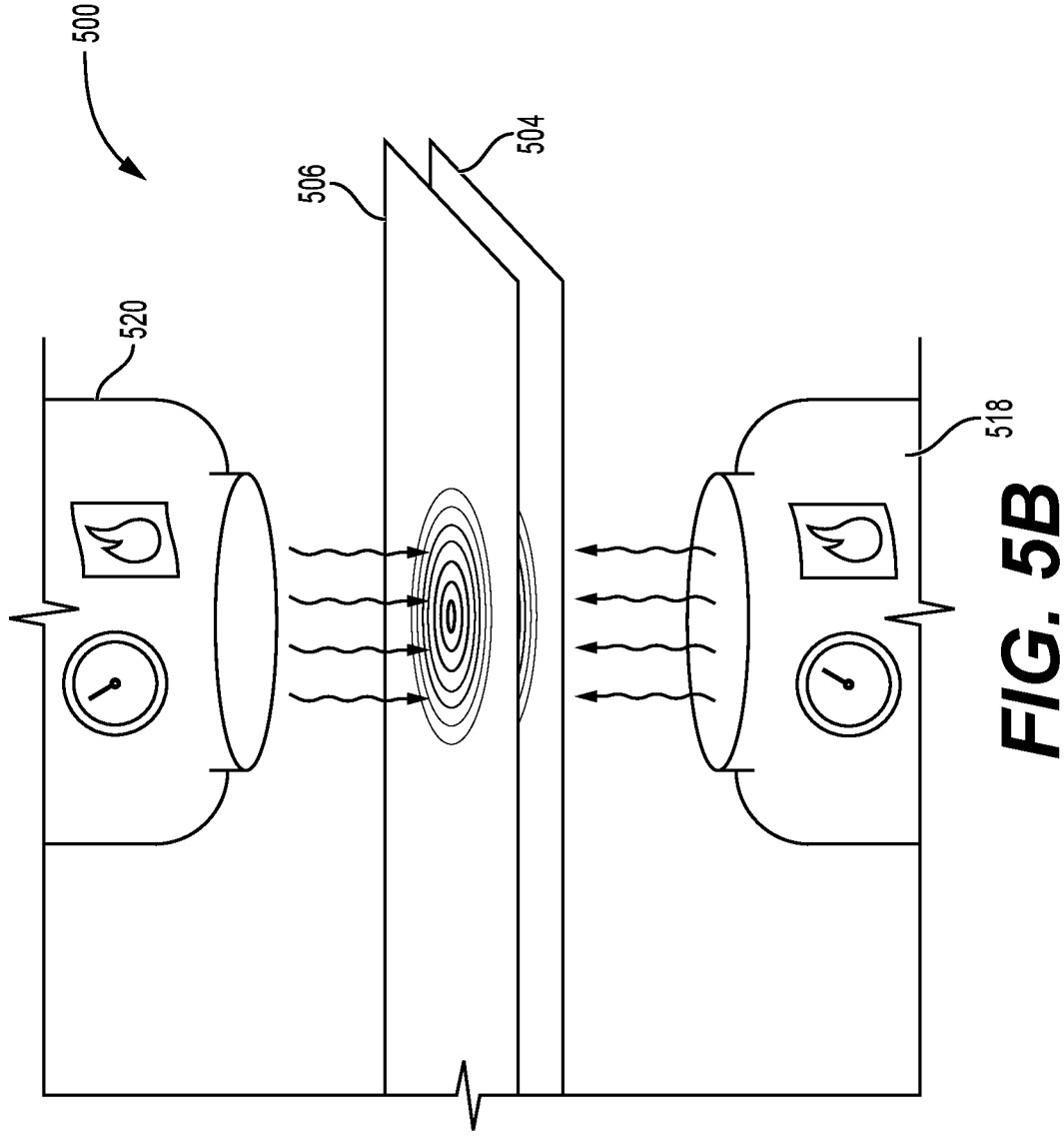

FIG. 5A illustrates system 500 prior to introducing first and second sheets 504, 506 between the upper mold portion (not shown) and the lower mold portion (not shown). System 500 may include a sheet feeder or conveyor system 510 that may be used to introduce sheets 504, 506 between the mold portions, as shown. In some examples, system 500 may further include heating systems 518, 520, which subject first and second sheets 504, 506 to thermal energy prior to being introduced between the mold portions, as shown in FIG. 5B. This thermal energy raises the temperature of sheets 504, 506 to a temperature that is optimal for shaping and melding.

Figure 5C:
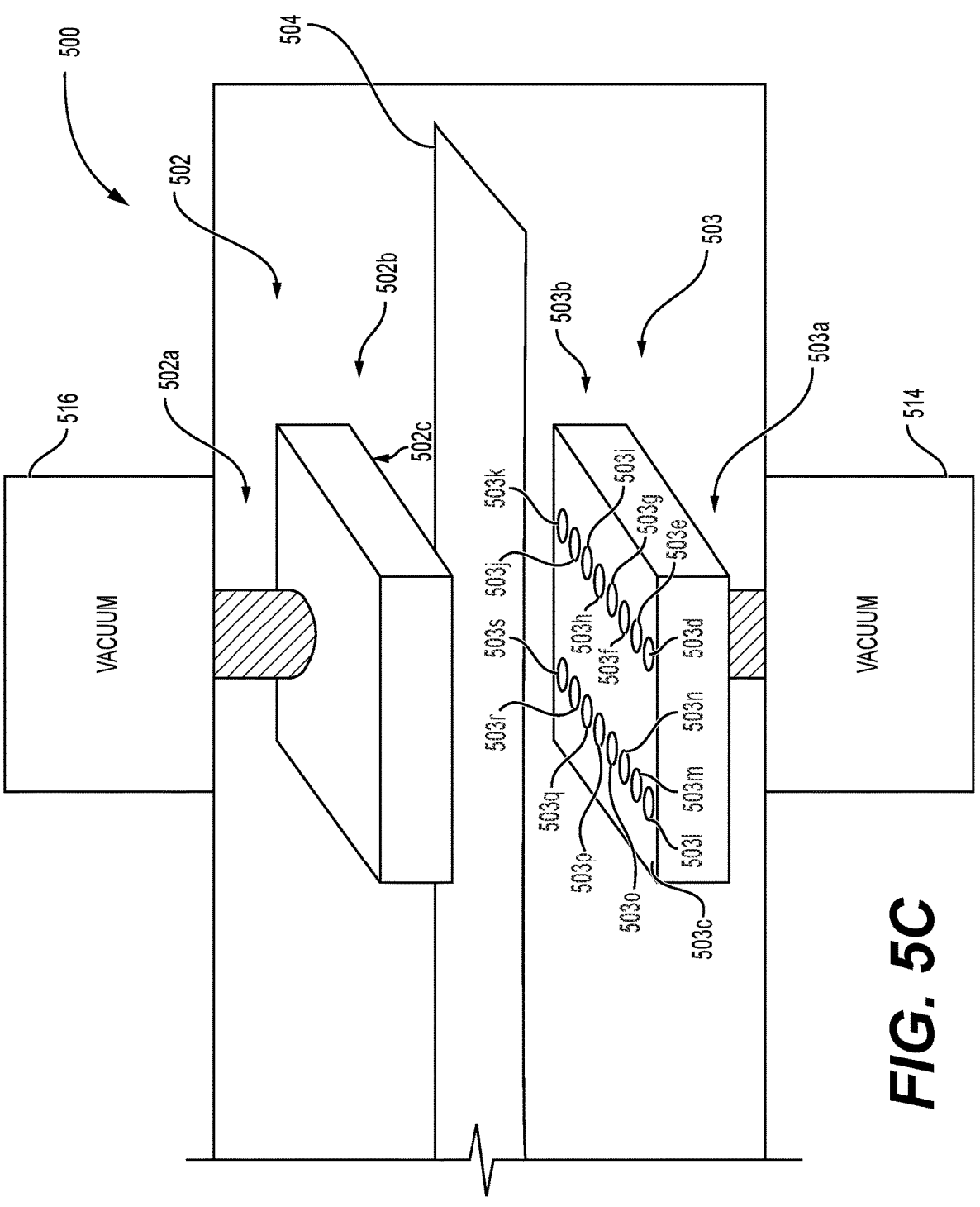

FIG. 5C illustrates system 500 configured to first introduce first sheet 504 between upper mold portion 502 and lower mold portion 503. In other examples, though not shown, system 500 may be configured to introduce first and second sheets 504, 506 simultaneously or sequentially between the upper and lower mold portions 502, 503. As discussed with respect to FIG. 4A, upper mold portion 502 may include a upper portion 502a and a lower portion 502b having a flat or substantially flat bottom surface 502c, and lower mold portion 503 may include a lower portion 503a and a upper portion 503b having a flat or substantially flat top surface 503c that faces the bottom surface of upper mold portion 502. The bottom surface 502c and top surface 503c may each include a plurality of mold cavities, such as mold cavities 503d-503s on top surface 503c, disposed therein.

While system 500 is in an open configuration, first sheet 504 may be introduced between upper mold portion 502 and lower mold portion 503 and positioned adjacent to top surface 503c so that the plane of sheet 504 is generally aligned with the top surface 503c. As used herein, the term "open configuration" refers to the upper mold portion and lower mold portion being configured to form a void between the mold portions. In this configuration, the void is large enough to allow components of the system (e.g., first sheet, second sheet, forming tool, etc.) to enter into the system.

Figure 5D:
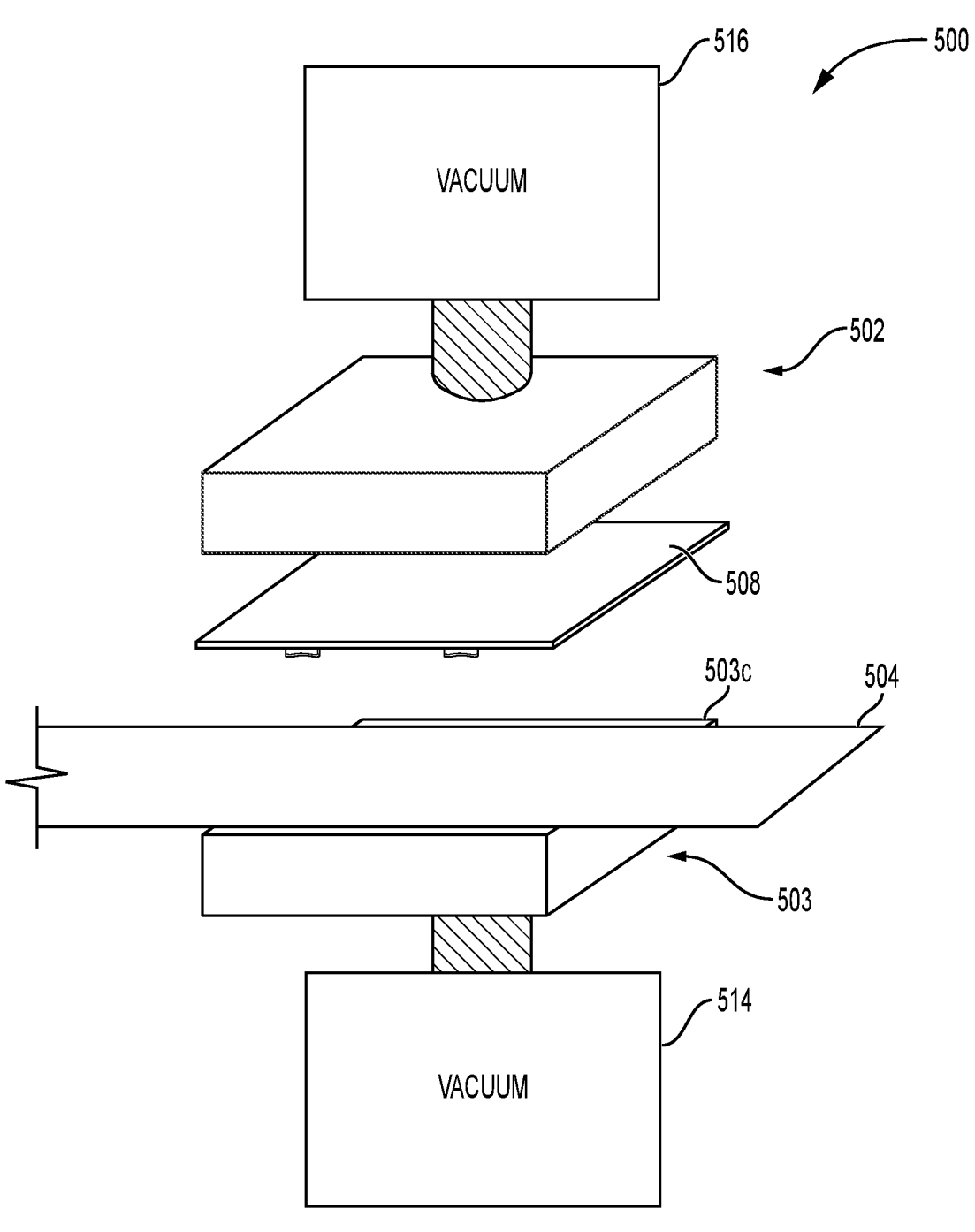

As shown in FIG. 5D, once first sheet 504 is positioned adjacent to top surface 503c, first sheet 504 may then be brought into contact with top surface 503c. That is, system 500 may be configured to move lower mold portion 503 toward the first sheet 204 so that first sheet 204 may be in contact with top surface 503c. In some cases, first sheet 504 may simultaneously be exposed to a negative pressure environment (e.g., below atmospheric pressure) by vacuum system 514 so as to cause sheet 504 to be drawn into one or more mold cavities (not shown) of lower mold portion 503.

In other cases, the forming tool 508 may be introduced into system 500 between upper mold portion 502 and lower mold portion 503, so that when pressed into first sheet 504, forming tool 508 is at a set position relative to the mold cavities (not shown) of the lower mold portion 503. Once at a set position, forming tool 508 may remain in a set position for a time period of about 0.10 s to about 2 s, such as about 0.25 s to about 1.75 s, or about 0.50 s to about 1.25 s. In cases where forming tool 508 includes a plurality of protrusions, once forming tool 508 is introduced into system 500, each protrusion may be located at a set position relative to one mold cavity of the lower mold portion 503. While forming tool 508 is positioned between upper mold portion 502 and lower mold portion 503, in some cases, first sheet 504 may simultaneously be exposed to a negative pressure environment (e.g., below atmospheric pressure) by vacuum system 514 so as to cause sheet 504 to be drawn into one or more mold cavities (not shown) of lower mold portion 503.

Figure 5E:
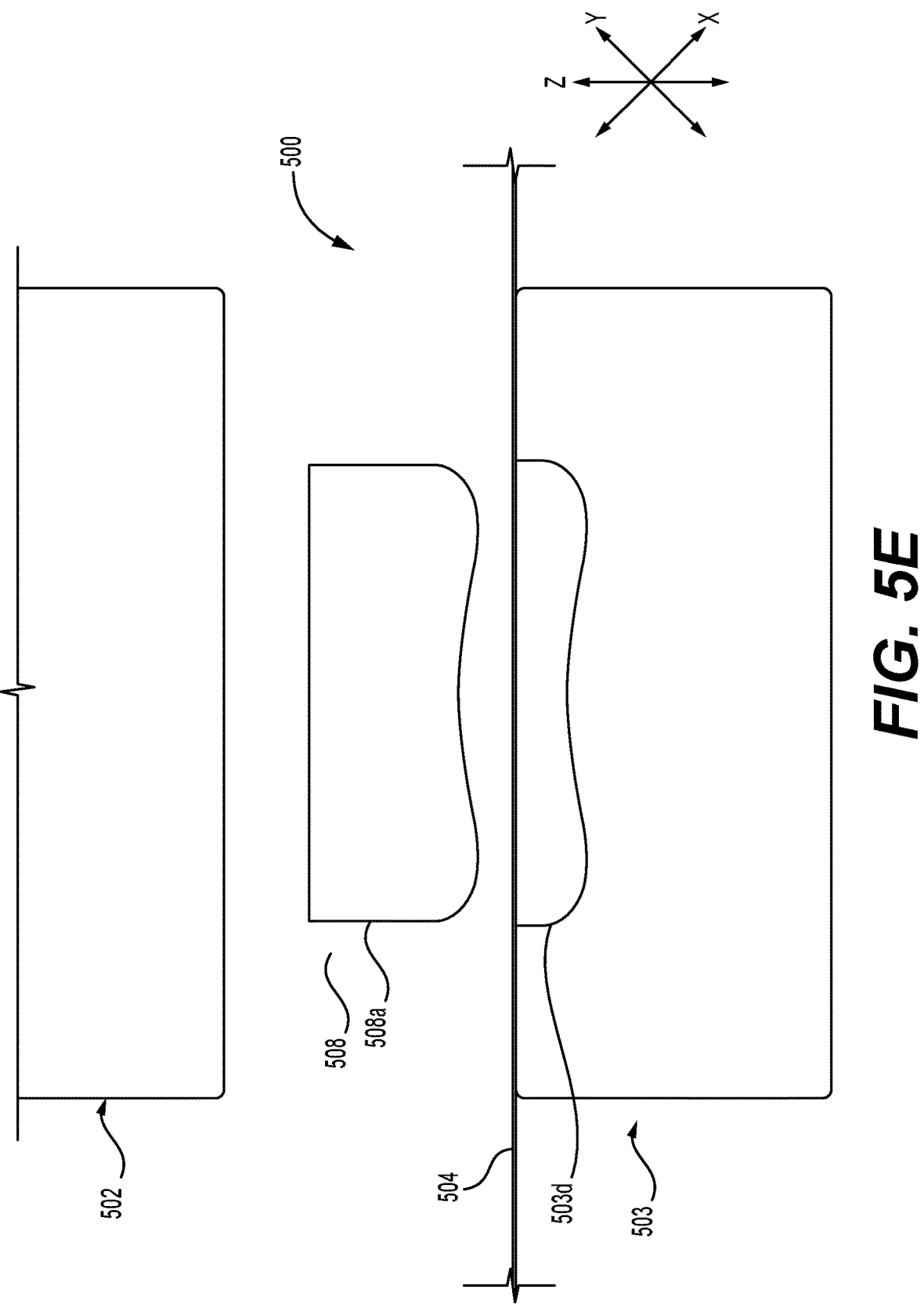

FIG. 5E provides a detailed and close-up view of a single protrusion 508a of forming tool 508 at a set position relative to a single mold cavity 503d of lower mold portion 503.

As shown in FIG. 5E, the set position of protrusion 508a may be at a z position relative to the mold cavity. As used herein, the term "z position" describes the spatial orientation of the protrusion relative to the mold (e.g., mold surface and/or mold cavity) after the forming tool is introduced into the system. Referring to a three-dimensional Cartesian coordinate system including an origin (reference point), an x-axis, a y-axis, and a z-axis, the term "z-position" refers to the position of the lowest point of the protrusion relative to the mold cavity (or a reference point on the mold, such as the mold surface) along the z-axis. Relative to a reference point, the z position may be in a range of about −18 mm to about −10 mm, such as about −16 mm to about −14 mm, or about −15 mm to about −12.5 mm, wherein the reference point is at the surface of mold and is equal to 0.

Figure 5F:
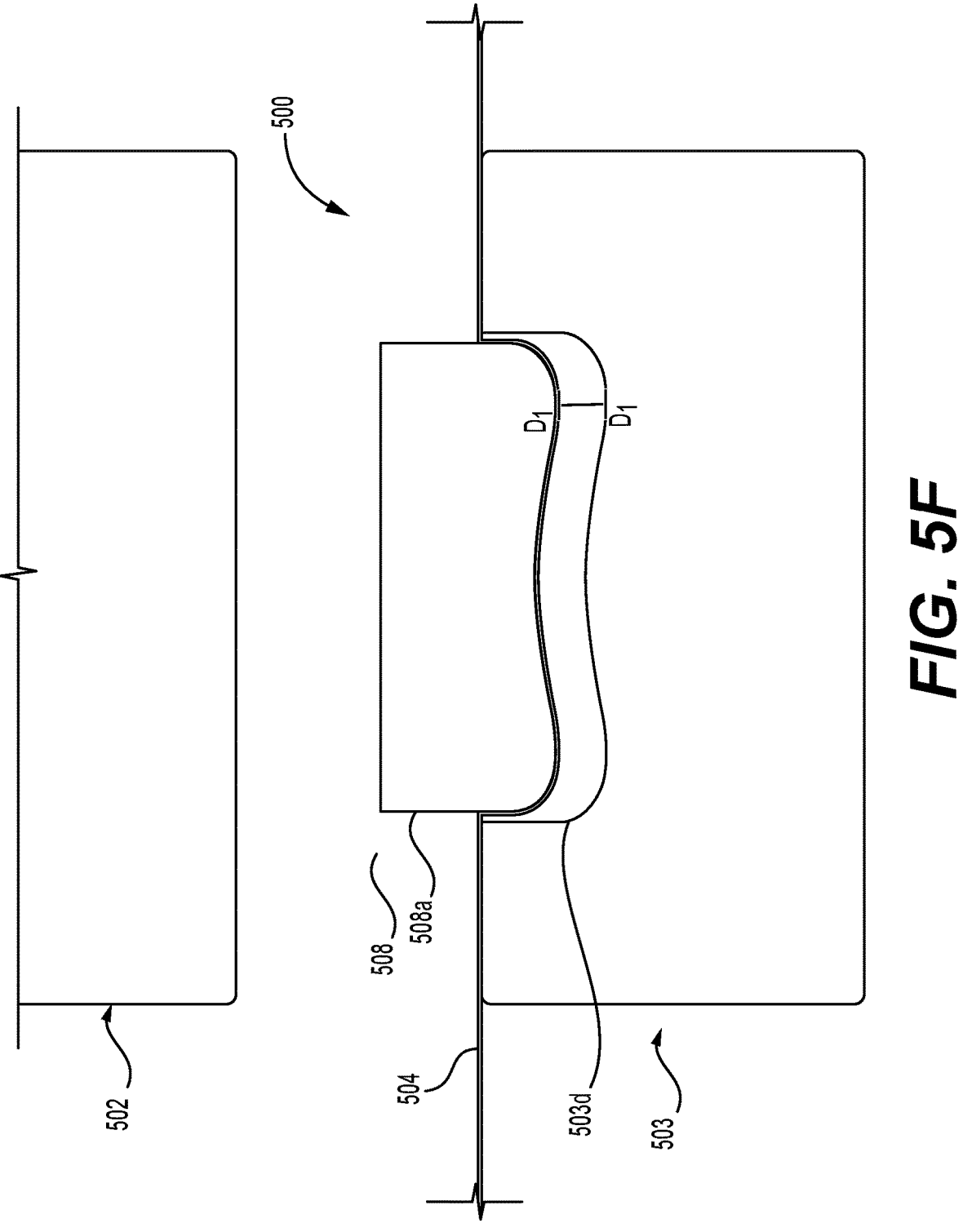

Once the forming tool is positioned at the set position, the forming tool may be pressed (or extended) into first sheet an offset distance relative to the surface of mold cavity. That is, an outermost surface of the forming tool may positioned away an offset distance away from an inner surface of the first cavity. In cases where the forming tool includes a plurality of protrusions, after the forming tool is pressed into first sheet, each protrusion may be located at offset distance Di-Di relative to the surface of mold cavity 503d, as shown in FIG. 5F. As used herein, the term "offset distance" refers to the minimum distance between the protrusion and the surface of the mold cavity. The distance is measured after the forming tool has been pressed into the first sheet (or second sheet). The offset distance may be in a range of about 0.1 mm to about 20 mm, such as about 1 mm to about 15 mm, or about 5 mm to about 10 mm.

Without being bound to any particular theory, the set position and/or offset distance may ensure that forming tool

508 imparts the desired properties (e.g., wall thickness uniformity, less material, etc.) to the cushioning element(s).

While system 500 is in an open configuration, forming tool 508 may be removed from lower mold portion 503. In some cases, forming tool 508 may be removed from lower mold portion 503 after a time period of about 0.10 s to about 2 s, such as about 0.25 s to about 1.75 s, or about 0.50 s to about 1.25 s.

Figure 5G:
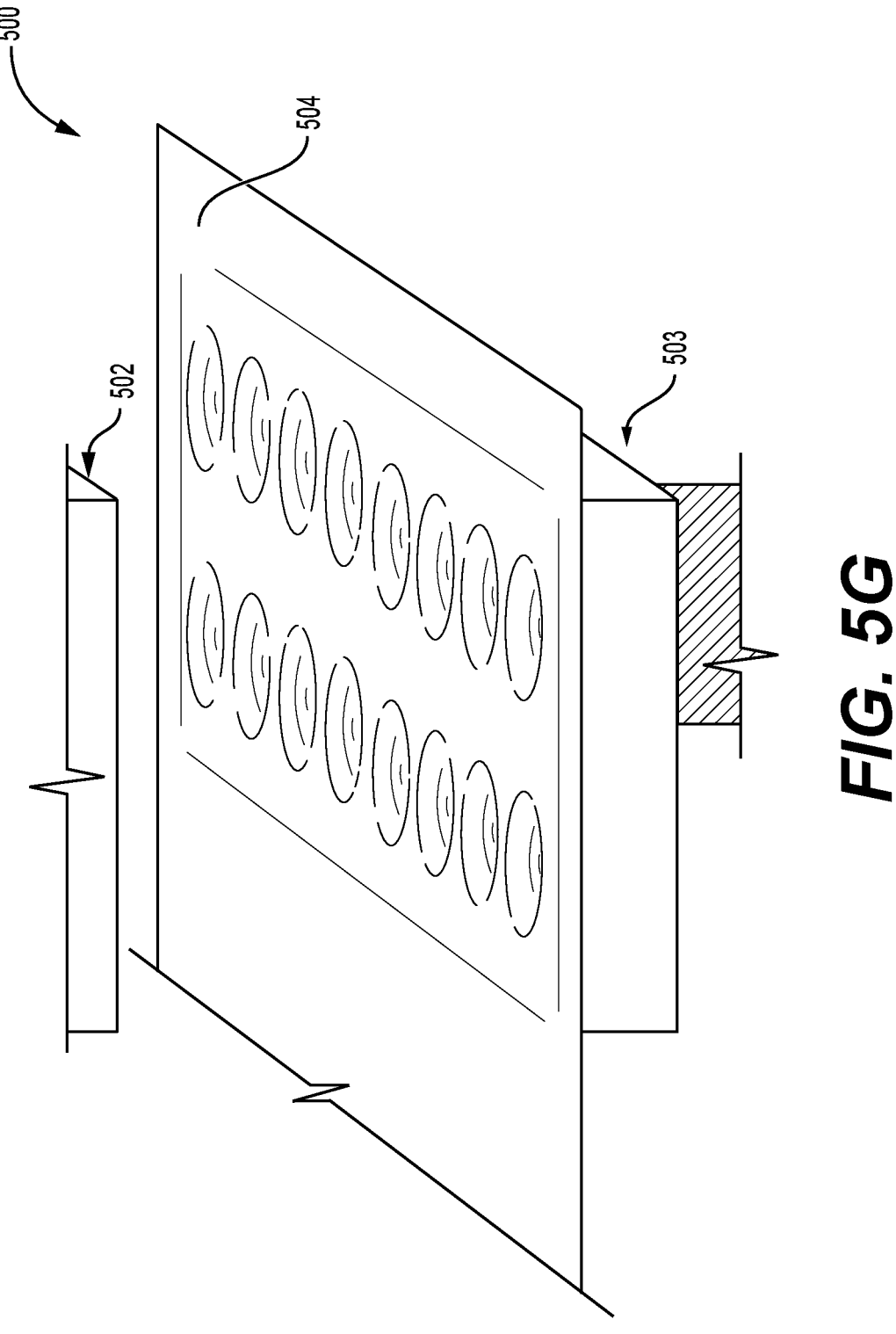

In some cases, after forming tool 508 is removed from lower mold portion 503, first sheet may be exposed to a negative pressure environment (e.g., below atmospheric pressure) by vacuum system 516 so as to cause sheet 504 to be drawn into mold cavities 503*d*-503*k* of lower mold portion 503, as shown in FIG. 5G. It should be understood that the discussion above regarding forming tool 508 or regarding the relationship of forming tool 508 to mold cavities 503*d*-503*s* may applicable to any forming tool or the forming tool(s) to any other mold cavity/cavities described herein.

Figure 5H:
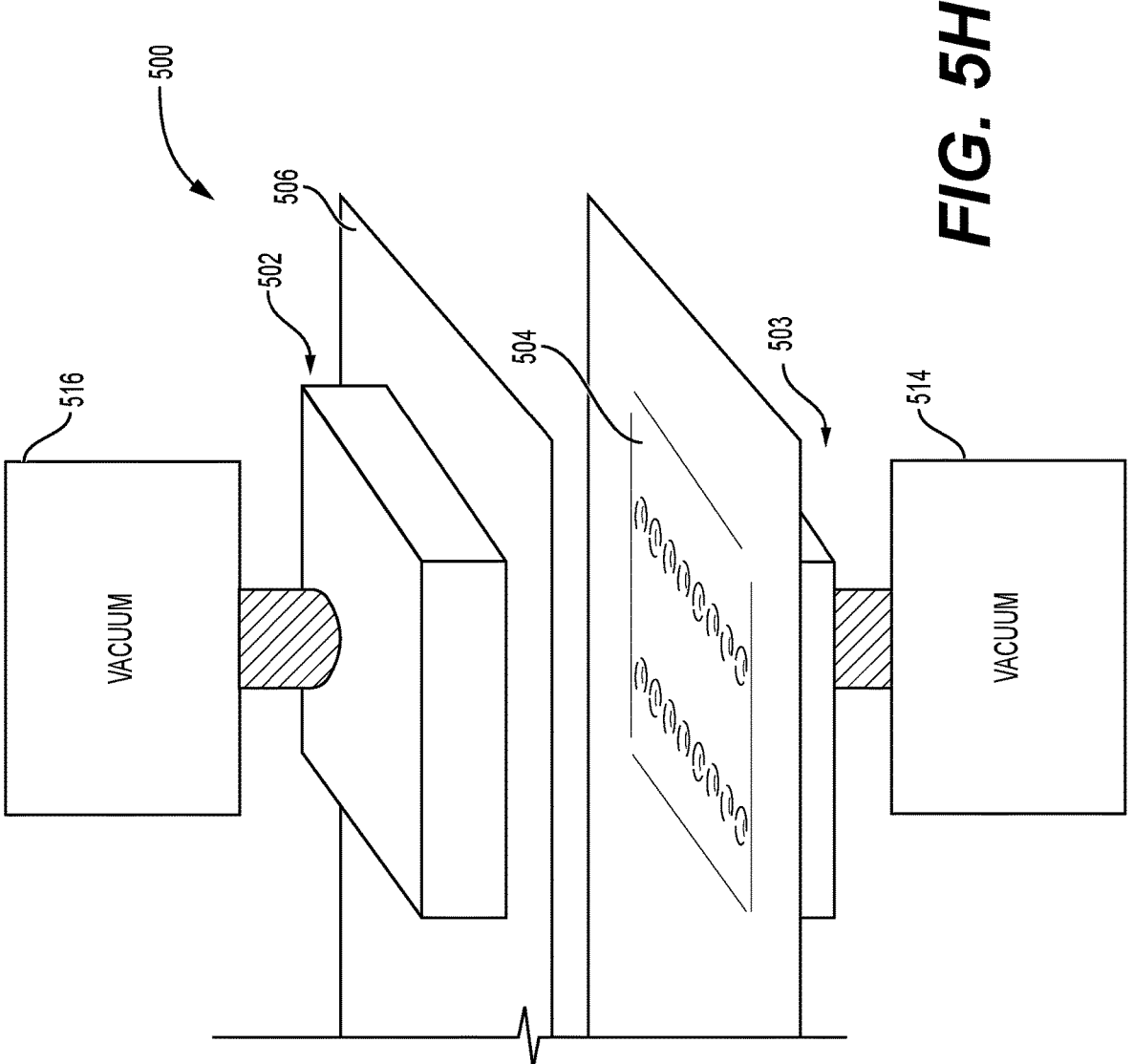
Figure 5I:
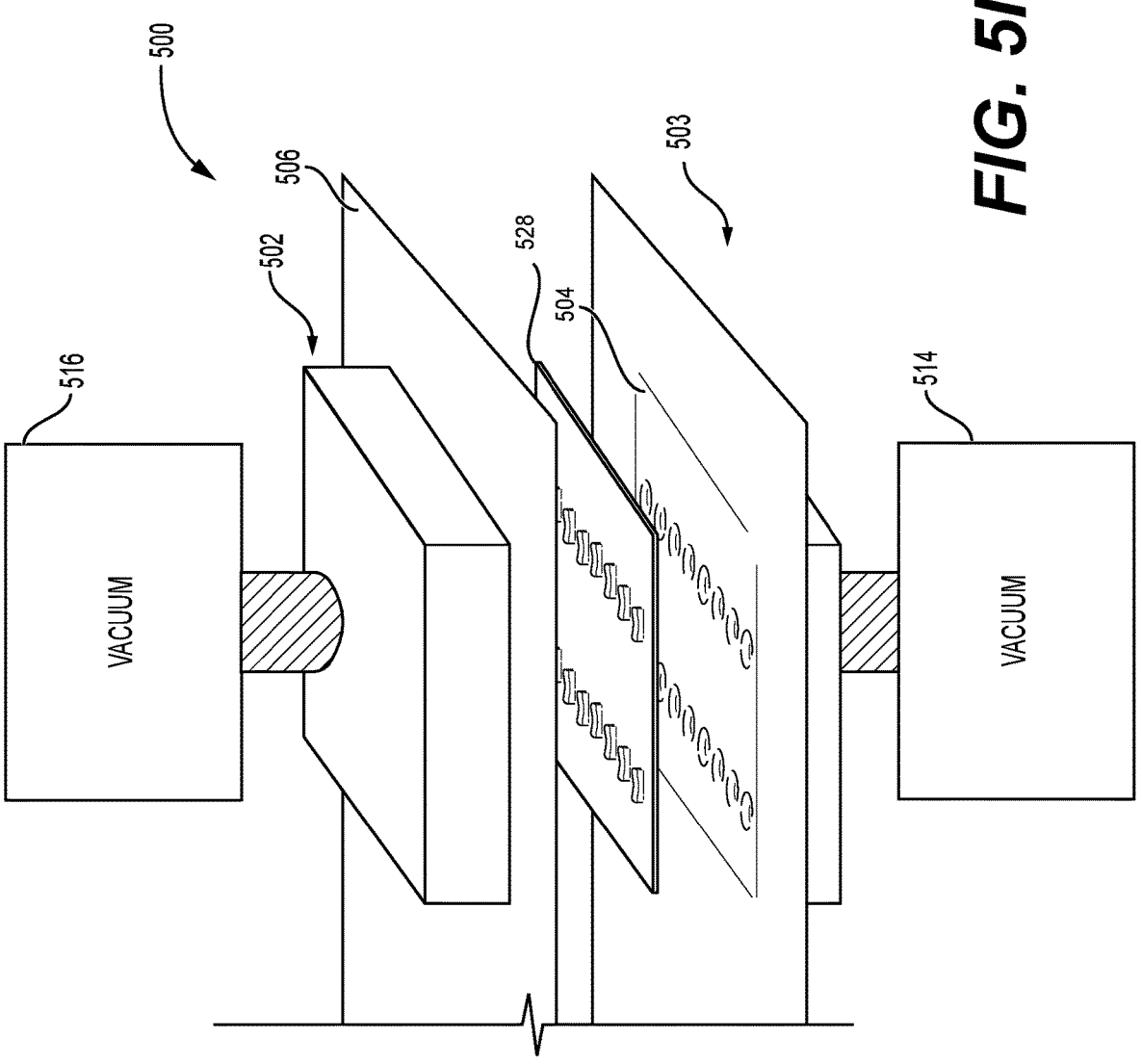

Thereafter, second sheet 506 may be introduced between upper mold portion 502 and lower mold portion 503 and positioned adjacent to the bottom surface of upper mold portion 502 so that the plane of sheet 506 is generally aligned with the bottom surface of upper mold portion 502, as shown in FIG. 5H. Once second sheet 506 is positioned relative to the bottom surface of upper mold portion 502, second sheet 506 may then be brought into contact with the bottom surface. That is, system 500 may be configured to move upper mold portion 502 so that second sheet 506 may be in contact with the bottom surface of the upper mold portion 502. As shown in FIG. 5I, in some cases, forming tool 528 may then be introduced into system 500 between upper mold portion 502 and lower mold portion 503, so that when pressed into second sheet 506, the forming tool is at a set position relative to the mold cavities of the upper mold portion 502. In cases where forming tool 528 includes a plurality of protrusions, once the forming tool is introduced into system 500, each protrusion may be located at a predetermined position relative to one mold cavity of the upper mold portion 502. In other cases, second sheet 506 may be exposed to a low-pressure environment (e.g., below atmospheric pressure) so as to cause sheet 506 to be drawn into the mold cavities of upper mold portion 502.

Figure 5J:
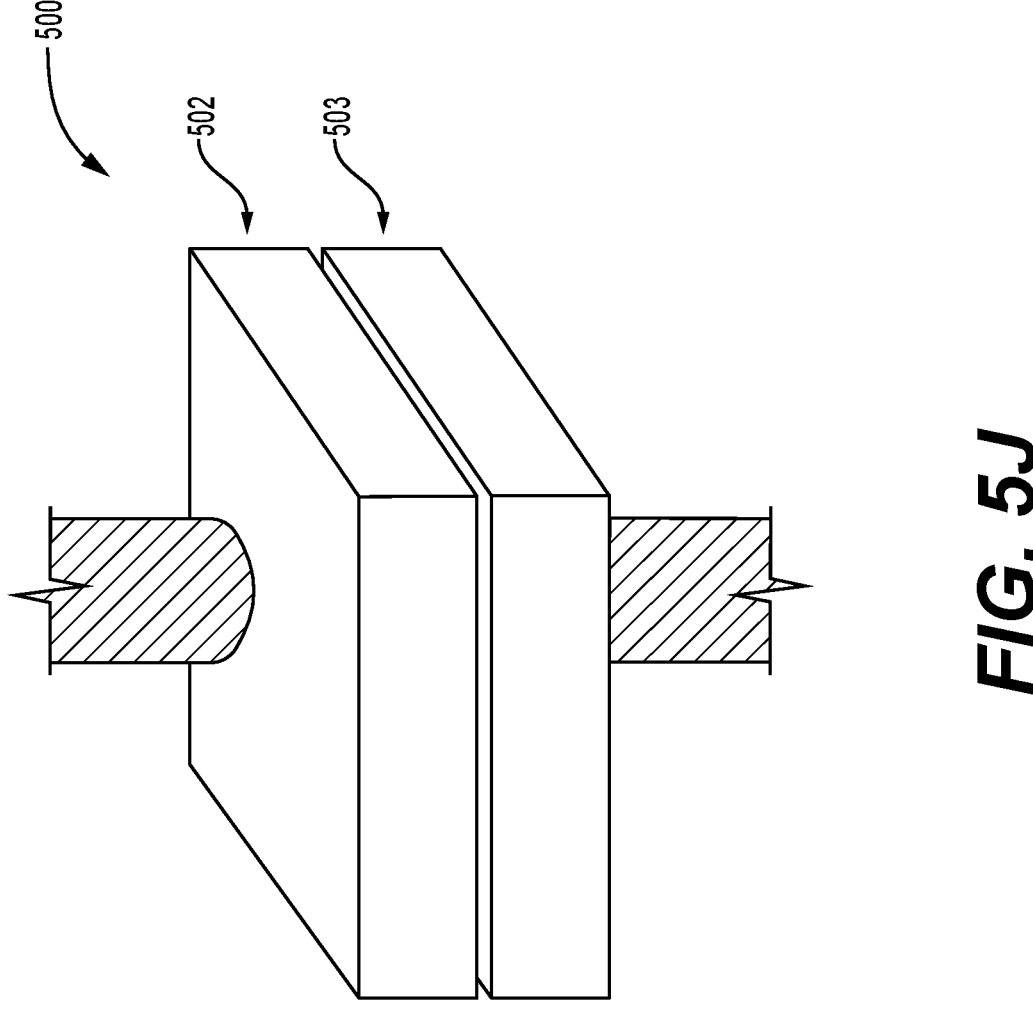

Turning to FIG. 5J, once second sheet 506 is introduced and positioned, upper mold portion 502 and lower mold portion 503 may be configured into a closed configuration. As used herein, the term "closed configuration" refers to the upper mold portion and lower mold portion being configured so that the bottom surface of the upper mold portion and top surface of the lower mold portion are pressed against one another. In some examples, while system 500 is in a closed configuration, system 500 may be adapted to cause first sheet 504 to partially bond to second sheet 506 around a periphery of each distinct set of corresponding mold cavities that is formed between upper and lower mold portions. System 500 may also be adapted to inject a fluid, such as gas, into a portion of each partially bonded periphery and to seal (e.g. by adhesive bonding and/or thermal bonding) each partially bonded periphery to thereby form the cushioning element(s). Once formed, the cushioning element(s) may comprise, consist essentially of, or consist of a fluid and/or the first and second sheets 504, 506, which cooperate to define a geometry or a three-dimensional shape (e.g., thicknesses, width, and lengths), as will be discussed below.

Figure 5K:
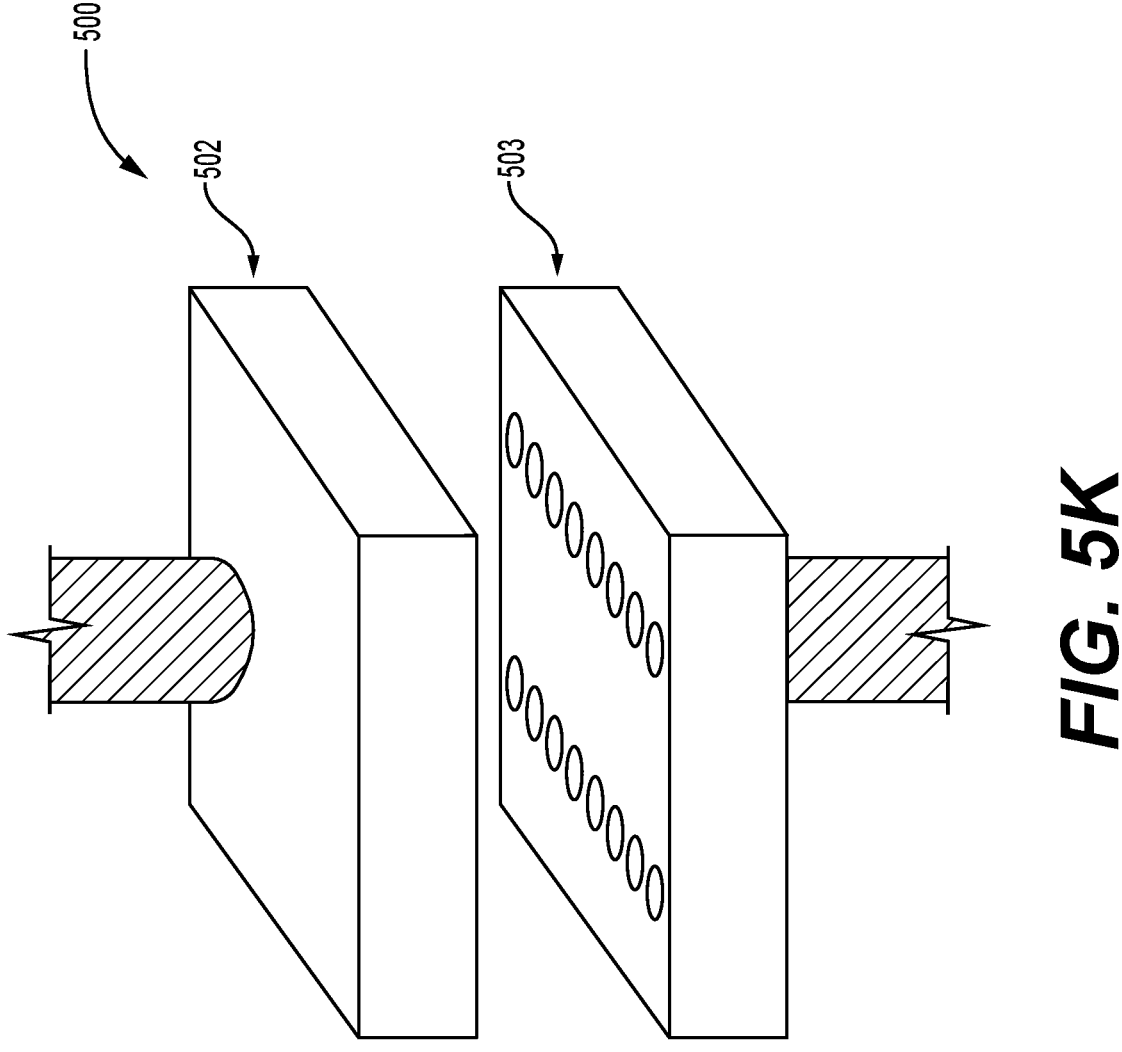

Turning to FIG. 5K, once the cushioning element(s) is/are formed, upper mold portion 502 and lower mold portion 503 may be configured into an open configuration so as to allow the formed cushioning element(s) to exit system 500 for further processing, such as cooling, trimming, inflating, and/or sealing the cushioning elements.

Using the above-described system, methods of forming a cushioning element or a plurality of cushioning elements may be performed. For example, as shown in FIGS. 5C-5G, the method may comprise placing a first sheet 504 adjacent to an outer surface 503*c* of a first mold portion 503, which may include a first cavity 503*d*. A portion of the first sheet 504 may be then pressed into the first mold portion 503 and into the first cavity 503*d* with a forming tool 508, and at least a portion of the forming tool 508 may be extended into the first cavity 503*d*. To draw the portion of the first sheet 508 into the first cavity 503*d*, negative pressure, such as from vacuum system 514, may be applied to the first cavity 503*d*.

In some cases, as shown in FIGS. 5H-5I, the method may further include placing a second sheet 506 adjacent to an outer surface 502*c* of a second mold portion 502, which may include a second mold cavity (not shown). A portion of the second sheet 506 may be pressed into the second mold portion 502 and into the second mold cavity with a second forming tool 528, and at least a portion of the second forming tool 528 may be extended into the second mold cavity. In some examples, to draw the portion of the second sheet 506 into the second mold cavity, negative pressure, such as from vacuum system 516, may be applied to the second mold cavity. As shown in 5H-5J, a second sheet 506 may be joined to the first sheet 504 to form the cushioning element, which may be inflated (e.g., filled with fluid) thereafter.

After the cushioning element(s) is/are formed, each of the plurality of cushioning elements may have a three-dimensional shape suitable for a sole structure of an article of footwear. In some examples, each of the plurality fluid-filled cushioning elements may have an irregular, three-dimensional shape, such as a tube shape. The tube shape may be, but is not limited to, a cylindrical tube shape, a rectangular tube shape, a U-shaped tube, an L-shaped tube, and/or an H-shaped tube.

Figures 6A, 6B:
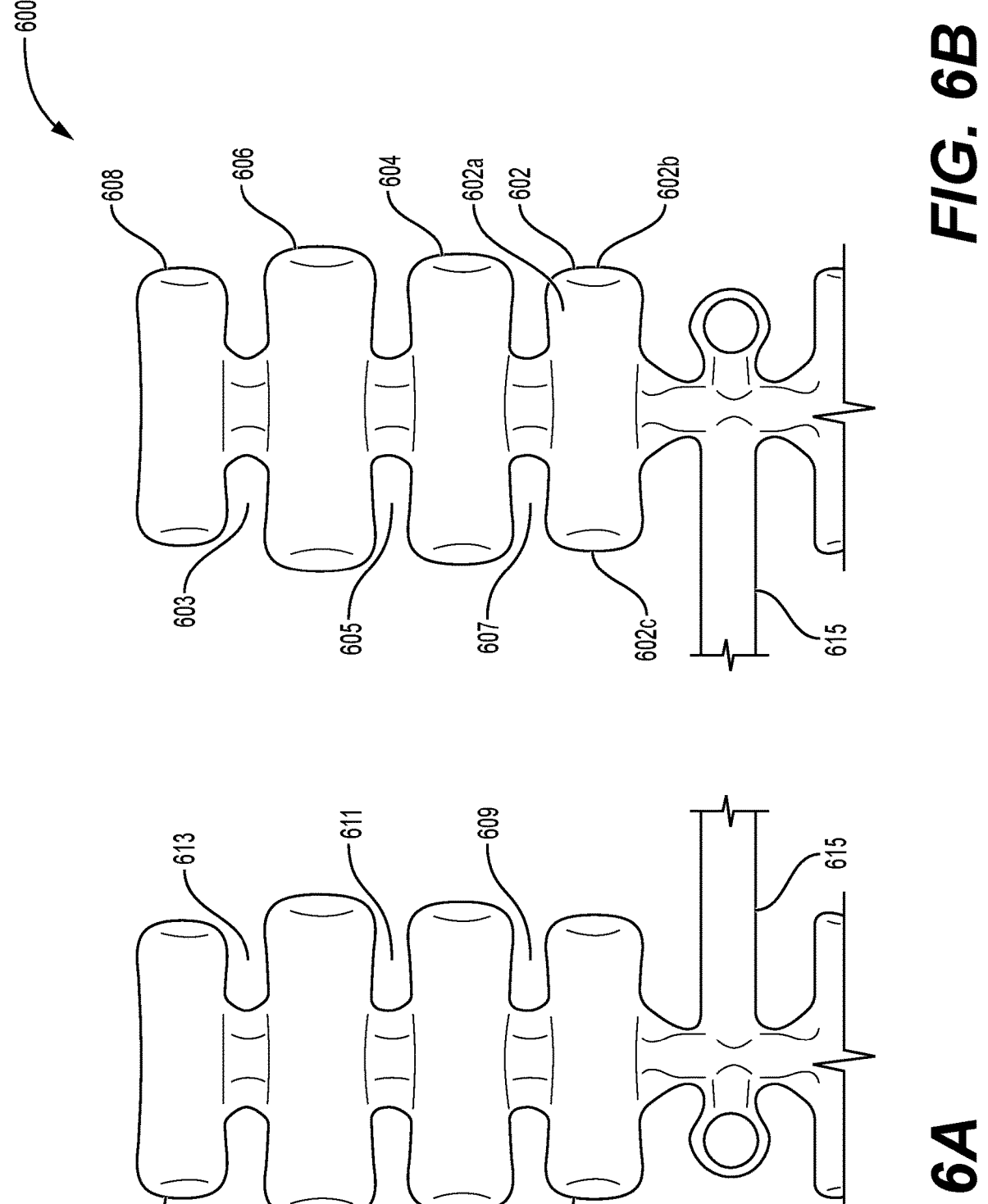
FIGS. 6A-B show images of cushioning elements manufactured using methods according to the present disclosure.
Figure 7A:
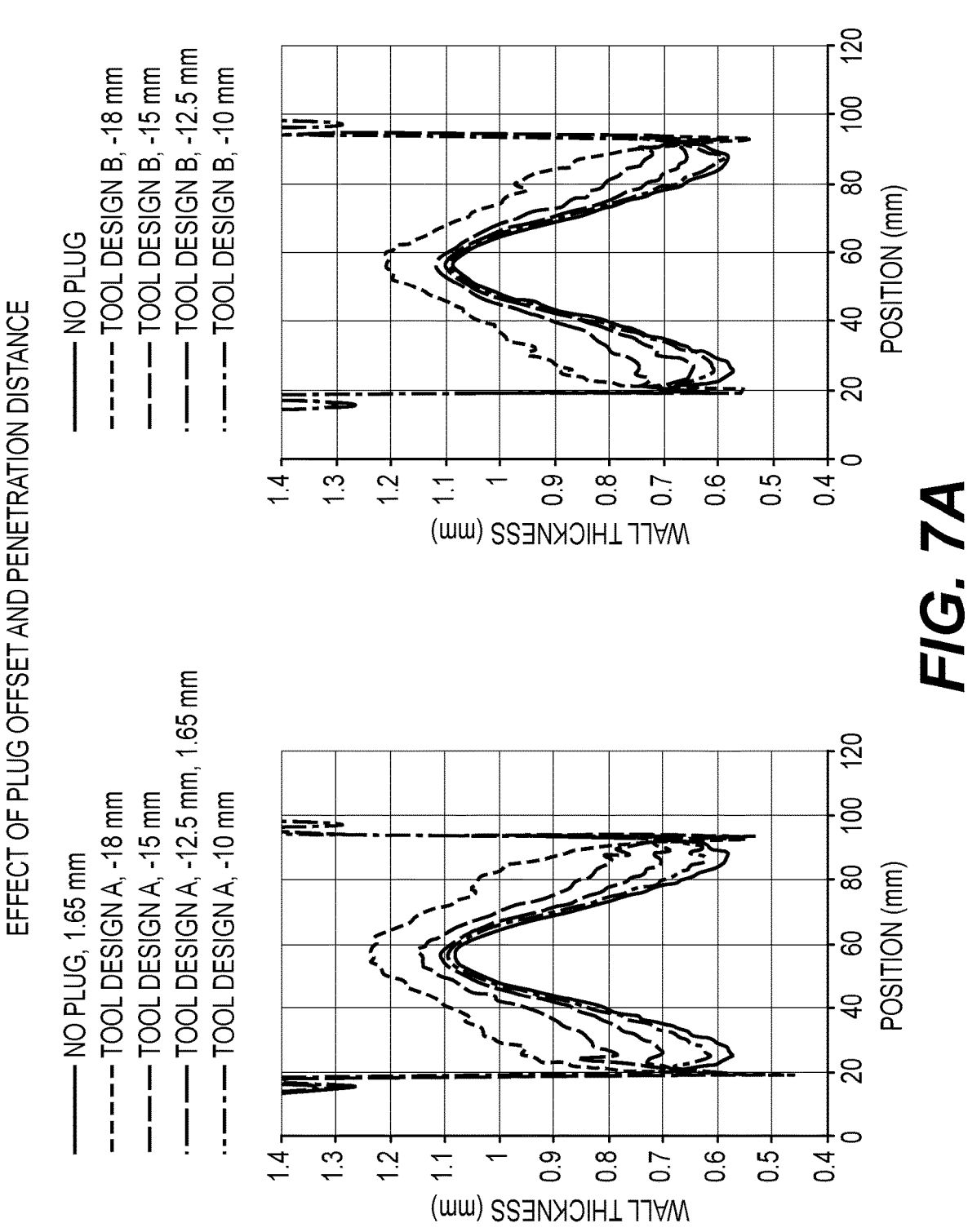
FIG. 7A includes two line graphs each illustrating a series of wall thickness measurements at various positions of a cushioning element formed without a forming tool as compared to a series of wall thickness measurements at various positions of four cushioning elements formed according to the systems and/or methods of the present disclosure.
Figure 7B:
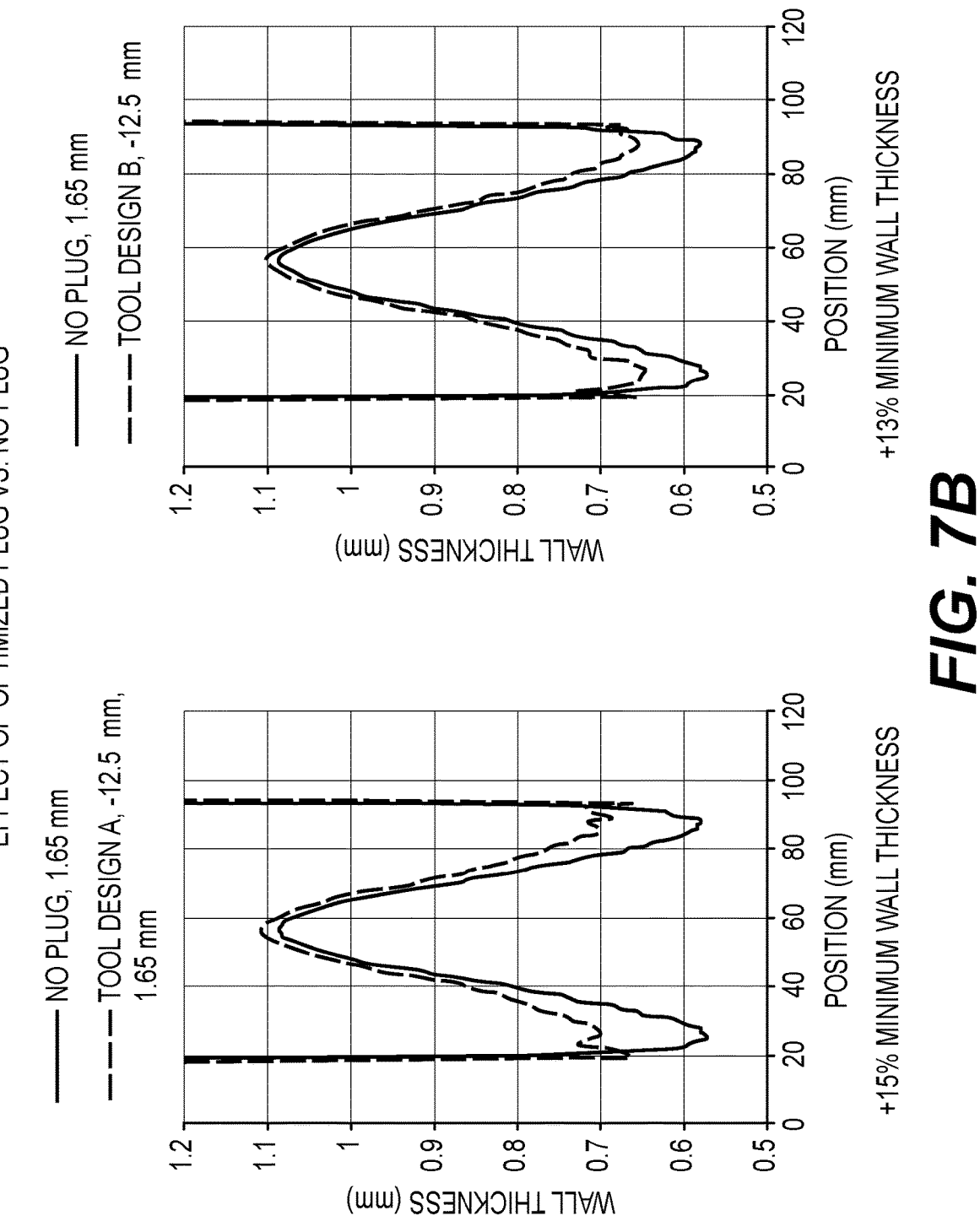
FIG. 7B includes two line graphs each illustrating a series of wall thickness measurements at various positions of a cushioning element formed with a forming tool as compared to a series of wall thickness measurements at various positions of a cushioning element formed according to the systems and/or methods of the present disclosure.

FIGS. 6A-B are images of cushioning elements 600, each having a cylindrical tube shape, manufactured using methods of the present disclosure. As shown, eight cushioning elements 602, 604, 606, 608, 610, 612, 614, 616 are joined to each other at discrete locations, web areas 603, 605, 607, 609, 611, 613, 615. In these examples, a cushioning element, such as 602, may include a top surface 602*a*, a bottom surface (not shown), a first side surface 602*b*, and a second side surface 602*c*, with the first and second side surfaces 602*b*, 602*c* being disposed between the top 602*a* and bottom surfaces and being opposed to each other. Though not shown, in some examples, the top surface, the bottom surface, the first side surface, and/or the second side surface may each further include two end regions and a central region located between the two end regions.

After the cushioning element(s) is/are formed, each of the plurality of cushioning elements may include one or more materials suitable for a sole structure of an article of footwear. These one or more materials may correspond with the one or more materials of the first and second sheets. In some examples, the one or more materials of the first and second sheet may be barrier film. In these examples, the first and second sheets may each be produced from an elastomeric material that includes one or more thermoplastic polymers and/or one or more cross-linkable polymers. In an example, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular examples, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another example, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The first and second sheets may be multi-layer films including two or more layers. The first and second sheets may each independently include alternating layers of one or more TPU copolymer materials and one or more EVOH copolymer materials, where the total number of layers in each of the first and second sheets includes at least four (4) layers, at least ten (10) layers, at least twenty (20) layers, at least forty (40) layers, and/or at least sixty (60) layers.

The first and second sheets may comprise, consist essentially of, or consist of one or more barrier materials. As used herein, the term "barrier material" refers to a material comprising, consisting essentially of, or consisting of one or more gas barrier compounds. The gas barrier compound may be a polymeric gas barrier compound (i.e., a gas barrier polymer), or may be a non-polymeric gas barrier compound, such as an inorganic gas barrier compound. The barrier material may be a polymeric barrier material comprising, consisting essentially of, or consisting of one or more gas barrier polymers. The barrier material may be a polymeric barrier material comprising, consisting essentially of, or consisting of a mixture of one or more non-gas barrier polymers and one or more gas barrier polymers, or a barrier material comprising, consisting essentially of, or consisting of a mixture of one or more non-gas barrier polymers and one or more non-polymeric gas barrier compounds. The barrier material may comprise, consist essentially of, or consist of a non-polymeric barrier material, i.e., a material comprising, consisting essentially of, or consisting of a non-polymeric gas barrier compound. The barrier material may be present in a structure which includes regions of polymeric materials and non-polymeric barrier materials, such as a polymeric film coated with one or more layers of a non-polymeric barrier material. The gas transmission rate of the portion of the cushioning element comprising the barrier material may be less than 4 or less than 3 or less than 2 cubic centimeters per square meter per atmosphere per day per day. The gas transmission rate of the barrier film may be less than 4 or less than 3 or less than 2 cubic centimeters per square meter per atmosphere per day per day for a barrier film having a thickness of from about 72 micrometers to about 320 micrometers, as measured at 23 degrees Celsius and 0 percent relative humidity. The gas transmission rate of the barrier film may be from about 0.1 to about 3, or from about 0.5 to about 3, or from about 0.5 to about 3 cubic centimeters per square meter per atmosphere per day per day, including from about 0.1 to about 3, or from about 0.5 to about 3, or from about 0.5 to about 3 cubic centimeters per square meter per atmosphere per day per day for a film having a thickness of from about 72 micrometers to about 320 micrometers, as measured at 23 degrees Celsius and 0 percent relative humidity. The gas transmission rate, such as the oxygen gas or nitrogen gas transmission rate, may be measured using ASTM D1434.

The barrier material may comprise, consist essentially of, or consist of one or more non-polymeric gas barrier compounds, including one or more inorganic gas barrier compounds. The one or more inorganic gas barrier compounds may be chosen from a form of carbon, silica, silicate, clay, a metal, and any combination thereof. The metal may include a metal oxide or a metal alloy. The one or more inorganic gas barrier compounds may take the form of fibers, particulates, platelets, or combinations thereof. The fibers, particulates, or platelets may be nanoscale structures, including nanoscale fibers, nanoscale particulates, nanoscale platelets, and combinations thereof. Examples of inorganic barrier compounds include carbon fibers, glass fibers, glass flakes, silica particles, silica platelets, silica flakes, silicate particles, silicate platelets, silicate flakes, calcium carbonate particles, clay particles, clay platelets, mica platelets, talc particles, carbon black particles, graphite particles, graphite platelets, graphite flakes, metallic particles, metallic platelets, metallic flakes, and the like. The barrier material may comprise an inorganic gas barrier component consisting of all the inorganic gas barrier compounds present in the barrier material. The inorganic gas barrier component may consist of one or more clays. Suitable clays include bentonite, montmorillonite, kaolinite, and mixtures thereof. Optionally, in addition to the one or more non-polymeric gas barrier compounds, the barrier material may further comprise one or more additional ingredients, such as a polymer, processing aid, colorant, or any combination thereof. When one or more inorganic gas barrier compounds are included in the barrier material, the total concentration of the inorganic gas barrier component present in the barrier material may be less than 60 weight percent, or less than 40 weight percent, or less than 20 weight percent of the barrier material.

The one or more gas barrier compounds of the barrier material may comprise, consist essentially of one, or consist of one or more gas barrier polymers. The barrier material may be a thermoplastic material, meaning that the polymeric component of the barrier material consists of one or more thermoplastic polymers, optionally including thermoplastic polymers which are not gas barrier polymers. The barrier material may comprise, consist essentially of, or consist of one or more thermoplastic gas barrier polymers. The barrier material comprises a gas barrier polymer component consisting of all gas barrier polymers present in the barrier material. The gas barrier polymer component of the barrier material may consist of one or more gas barrier polymer of a single class of polymers such as, for example, one or more polyolefins. The gas barrier polymer component may consist of gas barrier polymers having similar or the same chemical structures, such as one or more ethylene-vinyl alcohol copolymers. Optionally, the barrier material may further comprise one or more non-polymeric additives, such as one or more fillers, processing aids, colorants, or any combination thereof; or one or more non-polymeric barrier compounds, such as one or more inorganic barrier compounds. Many gas barrier polymers are known in the art. Examples of gas barrier polymers include vinyl polymers such as vinylidene chloride polymers, acrylic polymers such as acrylonitrile polymers, polyamides, epoxy polymers, amine polymers, polyolefins such as polyethylenes and polypropylenes, copolymers thereof, such as ethylene-vinyl alcohol copolymers, and mixtures thereof. When the barrier material comprises, consists essentially of, or consists of one or more gas barrier polymers, the one or more gas barrier polymers may be chosen from a vinyl polymer, an acrylic polymer, an amide polymer, an imide polymer, an epoxy polymer, an olefin polymer, any homopolymer thereof, any copolymer thereof, and any mixture thereof. The one or more gas barrier polymer may comprise, consist essentially of, or consist of one or more thermoplastic gas barrier polymers. Examples of thermoplastic gas barrier polymers include thermoplastic vinyl homopolymers and copolymers, thermoplastic acrylic homopolymers and copolymers, thermoplastic amine homopolymers and copolymers, thermoplastic polyolefin homopolymers and copolymers, and mixtures thereof. The one or more gas barrier polymers may comprise, consist essentially of, or consist of one or more thermoplastic polyethylene copolymers. The one or more gas barrier polymers may comprise, consist essentially of, or consist of one or more thermoplastic ethylene-vinyl alcohol copolymers. The thermoplastic ethylene-vinyl alcohol copolymer may be an ethylene-vinyl alcohol copolymer having from about 28 mole percent to about 44 mole percent ethylene content, or from about 32 mole percent to about 44 mole percent ethylene content. The one or more gas barrier polymers may comprise, consist essentially of, or consist of one or more one or more polyethyleneimine, polyacrylic acid, polyethyleneoxide, polyacrylamide, polyamidoamine, or any combination thereof.

The barrier material (including a first barrier material, a second barrier material, etc.) may have a low gas transmittance rate. For example, when formed into a single-layer film consisting essentially of the barrier material, the single-layer film may have a low gas transmittance rate of less than 4 cubic centimeters per square meter per atmosphere per day per day for a film having a thickness of from about 72 micrometers to about 320 micrometers, as measured at 23 degrees Celsius and 0 percent relative humidity, and may be measured using ASTM D1434.

The barrier material may comprise, consists essentially of, or consist of one or more gas barrier compounds. The one or more gas barrier compounds may comprise, consist essentially of, or consist of one or more gas barrier polymers, or may comprise one or more non-polymeric gas barrier compounds, including one or more inorganic gas barrier compounds. The barrier material may comprise, consist essentially of, or consist of a combination of at least one gas barrier polymer and at least one inorganic gas barrier compound. The combination of at least one gas barrier polymer and at least one inorganic gas barrier compound may comprise a blend or mixture, or may comprise a composite in which fibers, particles, or platelets of the inorganic gas barrier compound are surrounded by the gas barrier polymer.

Regardless of the shape of the cushioning elements, each of the plurality of cushioning elements formed by the systems and methods herein may possess an improved wall thickness uniformity and may include less material than conventional cushioning elements, as illustrated by the data and measurements shown in FIGS. 7A-11. Without being bound to a particular theory, these characteristics may be conferred by the spatial positioning of the forming tool(s) as described herein.

The following clauses provide an exemplary configuration for systems and methods for forming a cushioning element or a plurality of cushioning elements using the thermoforming process as described above.

Clause 1. A method of forming a cushioning element, the method comprising: placing a first sheet adjacent to an outer surface of a first mold portion, the first mold portion including a first mold cavity; pressing a portion of the first sheet into the first mold portion and into the first mold cavity with a forming tool, wherein at least a portion of the forming tool is extended into the first mold cavity; applying negative pressure to the first mold cavity to draw the portion of the first sheet into the first mold cavity; joining a second sheet to the first sheet to form the cushioning element.

Clause 2. The method of clause 1, wherein pressing the portion of the first sheet into the first mold portion includes extending the portion of the forming tool into the first cavity until an outermost surface of the forming tool is positioned away from an inner surface of the first cavity by about 0.1 mm to about 4 mm.

Clause 3. The method of clause 1, wherein an innermost surface of the first cavity has an undulating curvature.

Clause 4. The method of clause 3, wherein the innermost surface of the first cavity has, when viewed from a vantage point adjacent to an opening of the first cavity: (1) a concave first portion; (2) a convex second portion laterally adjacent to the concave first portion; and (3) a concave third portion laterally adjacent to the convex second portion, at an opposite side of the convex second portion than the concave first portion.

Clause 5. The method of clause 4, wherein the portion of the forming tool extended into the first cavity has, from a vantage point at the innermost surface of the first cavity: (1) a convex first portion vertically aligned with the concave first portion of the first cavity; (2) a concave second portion vertically aligned with the convex second portion of the first cavity; and (3) a convex third portion vertically aligned with the concave third portion of the first cavity.

Clause 6. The method of clause 5, wherein a vertical space between the innermost surface of the first cavity and the outermost surface of the forming tool is the same across the length of the portion of the forming tool extended into the first cavity.

Clause 7. The method of clause 1, wherein, prior to joining the second sheet to the first sheet, the method further includes: placing the second sheet adjacent to an outer surface of a second mold portion, the second mold portion including a second mold cavity; pressing a portion of the second sheet into the second mold portion and into the second mold cavity with a second forming tool, wherein at least a portion of the second forming tool is extended into the second mold cavity; and applying negative pressure to the second mold cavity to draw the portion of the second sheet into the second mold cavity.

Clause 8. The method of clause 1, wherein, prior to joining the second sheet to the first sheet, the method further includes: placing the second sheet adjacent to an outer surface of a second mold portion, the second mold portion including a second mold cavity; pressing a portion of the second sheet into the second mold portion and into the second mold cavity with a second forming tool, wherein at least a portion of the second forming tool is extended into the second mold cavity.

Clause 9. The method of clause 1, wherein the first mold includes a plurality of first cavities spaced apart from one another along a longitudinal axis of the first mold portion, wherein a length of each first mold cavity extends transversely to the longitudinal axis.

Clause 10. The method of clause 9, wherein the first mold portion includes four first mold cavities, wherein each of two inner longitudinal mold cavities of the four first mold cavities have a larger length and height than each of two outer longitudinal mold cavities of the four first mold cavities.

Clause 11. The method of clause 1, wherein, prior to joining the second sheet to the first sheet, the method further includes exposing the first or second sheet to thermal energy in a range of from about 125° C. to about 225° C.

Clause 12. The method of clause 1, further including inflating the cushioning element.

Clause 13. The method of clause 1, wherein the first sheet is thinner than the second sheet.

Clause 14. The method of clause 1, wherein the first or second sheet includes a barrier film comprising an elastomeric material, the elastomeric material including one or more thermoplastic polymers or one or more cross-linkable polymers.

Clause 15. The method clause 1, wherein the forming tool includes a foam material having a compressive strength in a range of from about 90 MPa to about 97 MPa or a service temperature in a range of from about 149° C. to about 204° C.

Clause 16. The method of clause 1, wherein the cushioning element has a cylindrical tube shape and includes as a top surface, a bottom surface, a first side surface, and a second side surface, the first and second side surfaces being disposed between the top and bottom surfaces and being opposed to each other.

Clause 17. The method of clause 15, wherein at least a portion of the bottom surface has a thickness in a range of from about 0.75 mm to about 0.95 mm, or wherein at least a portion of the first side surface or second side surface has a thickness in a range of from about 0.45 mm to about 0.7 mm.

Clause 18. The method of clause 16, wherein the thickness of the at least a portion of the first side surface or second side surface and the thickness of the at least a portion of the bottom surface have a difference of less than about 0.1 mm.

Clause 19. A system for thermoforming a cushioning element, the system comprising: an upper mold portion having a plurality of mold cavities; a lower mold portion having a plurality of mold cavities; and a forming tool, wherein the system is configured to: introduce a first sheet between the upper and lower mold portions; introduce the forming tool between the upper and lower mold portions at a set position relative to the mold cavities of the lower mold portion; press the forming tool into the first sheet; and introduce the second sheet between the upper mold portion and the lower mold portion.

Clause 20. The system of clause 19, wherein the system is further configured to: introduce a second forming tool between the upper and lower mold portions at a set position relative to the mold cavities of the upper mold portion; and press the second forming tool into the second sheet.

We claim:

1. A method of forming a cushioning element, the method comprising:

placing a first sheet adjacent to an outer surface of a first mold portion, the first mold portion including a first mold cavity;

pressing a portion of the first sheet into the first mold portion and into the first mold cavity with a forming tool, wherein at least a portion of the forming tool is extended into the first mold cavity;

applying negative pressure to the first mold cavity to draw the portion of the first sheet into the first mold cavity;

after applying negative pressure to the first mold cavity, placing a second sheet adjacent to an outer surface of a second mold portion, the second mold portion including a second mold cavity;

pressing a portion of the second sheet into the second mold portion and into the second mold cavity;

applying negative pressure to the second mold cavity to draw the portion of the second sheet into the second mold cavity;

joining the second sheet to the first sheet to form the cushioning element; and inflating the cushioning element.

2. The method of claim 1, wherein pressing the portion of the first sheet into the first mold portion includes extending the portion of the forming tool into the first cavity until an outermost surface of the forming tool is positioned away from an inner surface of the first cavity by about 0.1 mm to about 4 mm.

3. The method of claim 1, wherein an innermost surface of the first cavity has an undulating curvature.

4. The method of claim 3, wherein the innermost surface of the first cavity has, when viewed from a vantage point adjacent to an opening of the first cavity:

(1) a concave first portion;

(2) a convex second portion laterally adjacent to the concave first portion; and (3) a concave third portion laterally adjacent to the convex second portion, at an opposite side of the convex second portion than the concave first portion.

5. The method of claim 4, wherein the portion of the forming tool extended into the first cavity has, from a vantage point at the innermost surface of the first cavity:

(1) a convex first portion vertically aligned with the concave first portion of the first cavity;

(2) a concave second portion vertically aligned with the convex second portion of the first cavity; and (3) a convex third portion vertically aligned with the concave third portion of the first cavity.

6. The method of claim 5, wherein a vertical space between the innermost surface of the first cavity and an outermost surface of the forming tool is the same across the length of the portion of the forming tool extended into the first cavity.

7. The method of claim 1, wherein the first mold includes a plurality of first cavities spaced apart from one another along a longitudinal axis of the first mold portion, wherein a length of each first mold cavity extends transversely to the longitudinal axis.

8. The method of claim 7, wherein the first mold portion includes four first mold cavities, wherein each of two inner longitudinal mold cavities of the four first mold cavities have a larger length and height than each of two outer longitudinal mold cavities of the four first mold cavities.

9. The method of claim 1, wherein, prior to joining the second sheet to the first sheet, the method further includes exposing the first or second sheet to thermal energy in a range of from about 125° C. to about 225° C.

10. The method of claim 1, wherein the first sheet is thinner than the second sheet.

11. The method of claim 1, wherein the first or second sheet includes a barrier film comprising an elastomeric material, the elastomeric material including one or more thermoplastic polymers or one or more cross-linkable polymers.

12. The method of claim 1, wherein the cushioning element has a cylindrical tube shape and includes as a top surface, a bottom surface, a first side surface, and a second side surface, the first and second side surfaces being disposed between the top and bottom surfaces and being opposed to each other.

13. The method of claim 12, wherein at least a portion of a material forming the bottom surface has a thickness in a range of from about 0.75 mm to about 0.95 mm, or wherein at least a portion of a material forming the first side surface or a material forming the second side surface has a thickness in a range of from about 0.45 mm to about 0.7 mm.

14. The method of claim 12, wherein a thickness of the at least a portion of a material forming the first side surface or a material forming the second side surface and the thickness of the at least a portion of the material forming the bottom surface have a difference of less than about 0.1 mm.

15. A method of forming a cushioning element, the method comprising:

placing a first sheet adjacent to an outer surface of a first mold portion, the first mold portion including a first mold cavity;

pressing a portion of the first sheet into the first mold portion and into the first mold cavity with a forming tool, wherein at least a portion of the forming tool is extended into the first mold cavity, and wherein the forming tool includes a foam material having a compressive strength in a range of from about 90 MPa to about 97 MPa or a service temperature in a range of from about 149° C. to about 204° C.;

applying negative pressure to the first mold cavity to draw the portion of the first sheet into the first mold cavity;

after applying negative pressure to the first mold cavity, placing a second sheet adjacent to an outer surface of a second mold portion, the second mold portion including a second mold cavity;

pressing a portion of the second sheet into the second mold portion and into the second mold cavity;

applying negative pressure to the second mold cavity to draw the portion of the second sheet into the second mold cavity; and joining the second sheet to the first sheet to form the cushioning element.

\* \* \* \* \*